(12) United States Patent
Basu et al.

(10) Patent No.: US 9,342,220 B2
(45) Date of Patent: May 17, 2016

(54) PROCESS MODELING AND INTERFACE

(71) Applicant: Microsoft Technology Licensing, LLC, Redmond, WA (US)

(72) Inventors: Arijit Basu, Bellevue, WA (US); Tao Wang, Bellevue, WA (US); Yi Zhang, Bellevue, WA (US); Sheng Peng, Sammamish, WA (US); Sridhar Srinivasan, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 346 days.

(21) Appl. No.: 13/828,061

(22) Filed: Mar. 14, 2013

(65) Prior Publication Data

US 2014/0282199 A1    Sep. 18, 2014

(51) Int. Cl.

| | | |
|---|---|---|
| G06F 3/0482 | (2013.01) | |
| G06F 3/0484 | (2013.01) | |
| G06F 3/0486 | (2013.01) | |
| G06F 17/30 | (2006.01) | |
| G06F 21/62 | (2013.01) | |
| G06Q 10/06 | (2012.01) | |
| G06Q 10/10 | (2012.01) | |

(52) U.S. Cl.
CPC ............. *G06F 3/0484* (2013.01); *G06Q 10/06* (2013.01); *G06F 3/0482* (2013.01); *G06F 3/0486* (2013.01); *G06F 3/04842* (2013.01); *G06F 17/30* (2013.01); *G06F 21/6227* (2013.01); *G06Q 10/0631* (2013.01); *G06Q 10/06311* (2013.01); *G06Q 10/06313* (2013.01); *G06Q 10/06316* (2013.01); *G06Q 10/063112* (2013.01); *G06Q 10/10* (2013.01); *G06Q 10/103* (2013.01); *G06Q 10/105* (2013.01); *G06Q 10/109* (2013.01)

(58) Field of Classification Search
CPC . G06F 3/0482; G06F 3/0484; G06F 3/04842; G06F 3/0486; G06F 17/30; G06F 21/6227; G06Q 10/06; G06Q 10/0631; G06Q 10/06311; G06Q 10/063112; G06Q 10/06313; G06Q 10/0633; G06Q 10/067; G06Q 10/10; G06Q 10/103; G06Q 10/105; G06Q 10/109; G06Q 10/06316; Y10S 707/99944
See application file for complete search history.

(56) References Cited

U.S. PATENT DOCUMENTS

| | | | | |
|---|---|---|---|---|
| 6,714,915 | B1 * | 3/2004 | Barnard et al. | 705/7.13 |
| 6,904,449 | B1 * | 6/2005 | Quinones | 709/203 |
| 7,853,678 | B2 * | 12/2010 | Khemani et al. | 709/223 |

(Continued)

OTHER PUBLICATIONS

"International Search Report & Written Opinion for PCT Patent Application No. PCT/US2014/022895", Mailed Date: Sep. 25, 2014, 9 Pages.

(Continued)

*Primary Examiner* — Eric J Bycer
(74) *Attorney, Agent, or Firm* — Thomas Marquis; Kate Drakos; Micky Minhas

(57) ABSTRACT

An instance of an existing data system has one or more processes. Each process has corresponding metadata. In one example method, metadata for a given process is accessed and a visual diagram of the process is automatically generated based on the diagram. The visual diagram is displayed on a user interface display and a user modification input is received on the user interface display modifying the visual diagram to obtain a modified visual diagram. The metadata corresponding to the process is modified based on the modification to the visual diagram.

15 Claims, 27 Drawing Sheets

(56) References Cited

U.S. PATENT DOCUMENTS

| | | | |
|---|---|---|---|
| 7,895,191 B2* | 2/2011 | Colossi et al. | 707/717 |
| 7,921,023 B2* | 4/2011 | Theiss et al. | 714/38.1 |
| 7,921,072 B2* | 4/2011 | Bohannon et al. | 707/601 |
| 7,971,180 B2* | 6/2011 | Kreamer et al. | 717/101 |
| 7,971,186 B1* | 6/2011 | Peyton | 717/115 |
| 8,060,396 B1* | 11/2011 | Bessler et al. | 705/7.23 |
| 8,082,169 B2* | 12/2011 | Crew et al. | 705/7.26 |
| 8,151,202 B1* | 4/2012 | Cronin et al. | 715/764 |
| 2003/0163365 A1* | 8/2003 | Farnes et al. | 705/11 |
| 2003/0225607 A1* | 12/2003 | Kopunovic et al. | 705/9 |
| 2003/0229529 A1* | 12/2003 | Mui et al. | 705/8 |
| 2004/0093350 A1* | 5/2004 | Alexander et al. | 707/104.1 |
| 2004/0103014 A1* | 5/2004 | Teegan et al. | 705/8 |
| 2004/0122699 A1* | 6/2004 | Brito et al. | 705/1 |
| 2005/0256818 A1* | 11/2005 | Sun et al. | 706/46 |
| 2005/0257136 A1* | 11/2005 | Charisius et al. | 715/511 |
| 2006/0031041 A1* | 2/2006 | Afshar et al. | 702/184 |
| 2006/0107265 A1* | 5/2006 | Schulz et al. | 718/100 |
| 2006/0173892 A1 | 8/2006 | Beck | |
| 2006/0184410 A1* | 8/2006 | Ramamurthy et al. | 705/8 |
| 2006/0200476 A1* | 9/2006 | Gottumukkala et al. | 707/100 |
| 2007/0038490 A1* | 2/2007 | Joodi | 705/7 |
| 2007/0150329 A1* | 6/2007 | Brook et al. | 705/8 |
| 2007/0276714 A1* | 11/2007 | Beringer | G06Q 10/0631 705/7.12 |
| 2008/0082569 A1 | 4/2008 | Mansour et al. | |
| 2008/0189069 A1* | 8/2008 | Beck | 702/123 |
| 2008/0195651 A1 | 8/2008 | Rachmiel | |
| 2008/0270451 A1 | 10/2008 | Thomsen | |
| 2008/0313110 A1* | 12/2008 | Kreamer et al. | 706/12 |
| 2009/0006167 A1* | 1/2009 | Toussaint | G06Q 10/06 705/7.27 |
| 2010/0117856 A1* | 5/2010 | Sonderegger | 340/870.02 |
| 2010/0131916 A1* | 5/2010 | Prigge | 717/104 |
| 2010/0185984 A1* | 7/2010 | Wright et al. | 715/833 |
| 2010/0280865 A1* | 11/2010 | Goja | 705/8 |
| 2010/0280883 A1* | 11/2010 | Ioannou | G06Q 10/063114 705/7.15 |
| 2010/0313179 A1* | 12/2010 | Groves et al. | 717/101 |
| 2011/0296336 A1* | 12/2011 | Law et al. | 715/777 |
| 2012/0131104 A1* | 5/2012 | Beaven et al. | 709/204 |
| 2012/0166246 A1* | 6/2012 | Simon | 705/7.26 |
| 2012/0233186 A1 | 9/2012 | Hammer | |
| 2013/0014080 A1 | 1/2013 | Brunswig | |
| 2013/0297528 A1* | 11/2013 | Stiehl | 705/348 |

OTHER PUBLICATIONS

Introduction to WebLogic Integration—Retrieved Date: Feb. 22, 2013, 15 pages. http://docs.oracle.com/cd/E13214_01/wli/docs81/overview/1intro.html.

Using Metadata for Generating Entity Diagrams in Microsoft Dynamics CRM 4.0—Published Date: Jan. 2009## Proceedings: NA, Author: Irina Agranov, pp. 6 http://msdn.microsoft.

/ERP for Siebel User Guide—Retrieved Date: Feb. 22, 2013 Proceedings: NA, Author: NA, pp. 18, http://publib.boulder.ibm.com/infocenter/rsdp/v1r0m0/topic/com.ibm.help.download.s.

Enhancing ERP System Value—Retrieved Date: Feb. 22, 2013 Author: Dan Everett, pp. 16 http://www.accountancy.com.pk/docs/ERP/wp_enhancing_erp_sys.pdf.

\* cited by examiner

FIG. 2F

| Name | Date modified | Type | Size |
|---|---|---|---|
| ProcessStep | 2/22/2013 1:00 AM | XML File | 69 KB |
| recording | 2/22/2013 12:57 AM | WMV File | 4,971 KB |
| recording_EbuEvents | 2/22/2013 12:57 AM | XML File | 4,476 KB |
| TaskStep | 2/22/2013 1:00 AM | XML File | 5 KB |

FIG. 2G

PROCESS EXPLORER

Work items

Thursday, December 20, 2012

| Process Group | Process | Activity | Task | Action | Date |
|---|---|---|---|---|---|
| BI Software Implementation | BI Software Implementation | BI Software Implementation | BI Software Implementation | Added | 1/15/2012 |
| BI Implementation | BI Implementation | BI Implementation | BI Implementation | Added | 2/15/2012 |
| Website Implementation | Website Implementation | Website Implementation | Website | Added | 2/15/2012 |
| POS System | POS System | POS System | Implementation | Added | 3/21/2012 |
| BI Implementation | BI Implementation | BI Implementation | POS System | Removed | 4/15/2012 |
| POS System | POS System | POS System | POS System | Added | 6/3/2012 |
| BI Implementation | BI Implementation | BI Implementation | BI Implementation | Removed | 6/8/2012 |
| POS System | POS System | POS System | POS System | Modified | 8/12/2012 |
| BI Implementation | BI Implementation | BI Implementation | BI Implementation | Added | 8/12/2012 |
| POS System | POS System | POS System | POS System | Added | 8/12/2012 |
| BI Implementation | BI Implementation | BI Implementation | BI Implementation | Added | 8/12/2012 |

FIG. 4B

PROCESS MODELING AND INTERFACE

BACKGROUND

Data systems are currently in wide use. They often help organizations perform day-to-day tasks.

By way of example, many business data systems are currently in wide use. Such business data systems can include, for example, enterprise resource planning (ERP) systems, customer resource management (CRM) systems, line-of-business (LOB) systems, and other business data systems.

In order to use a business data system, an organization normally begins with a base business data system that may be purchased by a seller. By way of example, assume that an organization is to begin using an ERP system. The organization may first determine the types of processing it needs from the ERP system, in order to implement its business. Then, the organization may purchase a base ERP system, from a seller, which meets many of the needs of the organization.

However, in general, the organization will normally customize the base ERP system, and add certain functional components to it, in order to have all of the needs of the organization met. That is, the base ERP system is not likely to fit 100 percent of the organization's needs. Therefore, there are gaps in the functionality provided by the base ERP system. By way of example, the base ERP system may be a 60 percent fit to the needs of the organization, but 40 percent of the functionality is not met (i.e., it falls in a gap). Therefore, customizations and modifications of the base ERP system are made in order to fill the gaps. The gaps are sometimes listed on a document referred to as a "fit gap list".

It can be very difficult to generate a fit gap list in a meaningful way. There are few, if any, tools which generate a visual representation of the functionality provided by an existing ERP (or other business data) system. Therefore, these visualizations are normally generated using a highly manual process. Similarly, it is very difficult to identify functionality which is missing, or which needs to be modified, for a given organization even after the visual representation of the base ERP system has been generated. Again, identifying the gaps in this way has been a highly manual, and non-standardized effort.

The discussion above is merely provided for general background information and is not intended to be used as an aid in determining the scope of the claimed subject matter.

SUMMARY

An instance of an existing data system has one or more processes. Each process has corresponding metadata. Metadata for a given process is accessed and a diagram of the process is automatically generated.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIGS. 2A-2G are illustrative user interface displays.

FIGS. 4A-4C are illustrative user interface displays.

DETAILED DESCRIPTION

Figure 1:
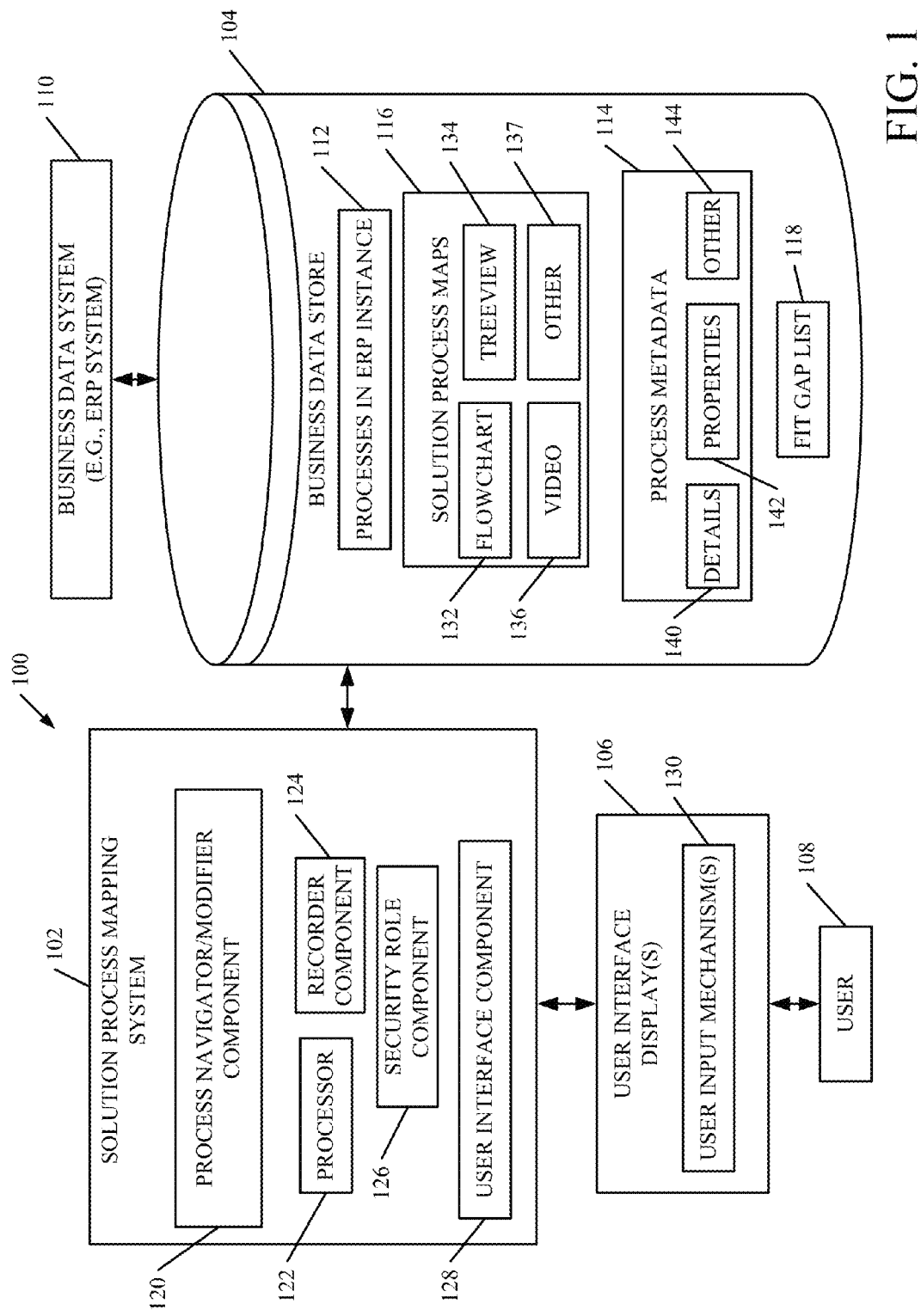
FIG. 1 is a block diagram of one embodiment of a solution process mapping architecture that maps processes and modifies the maps for processes.

FIG. 1 is a block diagram of one embodiment of a solution process mapping architecture 100. Architecture 100 includes solution process mapping system 102, business data store 104, user interface displays 106 that are displayed for interaction by user 108. Architecture 100 also shows a business data system 110 (which can be any business data system but is described herein for the sake of example as an ERP system) that accesses data in data store 104.

Data store 104 illustratively includes processes 112 in an instance of ERP system 110. The processes 112 each illustratively have a set of process metadata 114. Solution process maps 116 are maps that have already been generated for various processes in the solution that comprises the ERP instance of business data system 110. Fit gap lists 118 are illustratively lists that have been generated by solution process system 102.

FIG. 1 also shows that system 102 illustratively includes a process navigator/modifier component 120, processor 122, recorder component 124, security role component 126, and user interface component 128. User interface component 128 (by itself or under the control of other components or processors in system 102) illustratively generates user interface displays 106 that have user input mechanisms 130. User 108 can interact with the user input mechanisms 130 to access and control system 102. In one embodiment, user 108 can use process navigator/modifier component 120 to identify processes 112 and generate solution process maps 116 for those processes, as well as navigate existing maps 116 or modify existing maps 116.

User input mechanisms 130 can take a wide variety of different forms. For instance, they can be buttons, links, check boxes, text boxes, dropdown menus, icons, or any other of a wide variety of different user input mechanisms. In addition, user input mechanisms 130 can be actuated by user 108 in a wide variety of different ways as well. For instance, where user interface displays 106 are displayed on a touch sensitive screen, user 108 can actuate user input mechanisms 130 using touch gestures, such as by using the user's finger, a stylus, or another device. In addition, where user interface displays 106 are displayed on a device that has speech recognition components, user 108 can actuate user input mechanisms 130 using voice commands. User 108 can also actuate user input mechanisms 130 in other ways, such as by using a point and click device (e.g., a trackball or mouse), by using a hardware keyboard, a software keyboard, using a thumbpad, keypad, or a wide variety of different mechanisms.

Recorder component 124 can illustratively be used by user 108 to record solution process maps 116 for processes 112, based on metadata 114. Each solution process map 116 can include a variety of information, such as a flowchart, 132, tree view 134, a video 136 or other information 137. Process metadata 114 illustratively includes process details 140, properties 142 and other metadata 144.

Security role component 126 can illustratively be used by user 108 to assign a security role to different tasks or activities in a given process 112. This is described in greater detail below.

Processor 122 is illustratively a computer processor with associated memory and timing circuitry (not separately shown). Processor 122 is illustratively a functional component of system 102 and is activated by, and facilitates the functionality of, other components in system 102.

It should also be noted that, while data store 104 is shown as a single data store accessible by both system 102 and business data system 110, it can be multiple different data stores as well. In addition, the one or more data stores can be local to either system 102 or system 110, or remote from both of them. Similarly, some data stores 104 can be local, while others are remote. The remote data stores can be accessible through a network, such as a wide area network, a local area network, or otherwise. In addition, as described below, system 100 can be implemented in a cloud-based architecture as well.

Further, the functionality described herein is attributed to certain blocks in the block diagram. However, the blocks can be divided into more blocks, to perform the functionality, or combined into fewer blocks as well. All of this is contemplated herein.

Before describing the operation of architecture 100 in more detail, a brief overview will be provided in order to enhance understanding. User 108 can generate a solution process map 116 using recorder component 124 in order to record an already-existing process 112 in an instance of ERP system 110, or using process navigator/modifier component 120. User 108 can activate recorder component 124 and then select a process 112. System 102 generates user interface displays 106 that allow user 108 to walk through the process, executing it using user input mechanisms 130, while recorder component 124 is recording it. When the user 108 has completed the process, recorder component 124 can generate, from the recorded metadata corresponding to the process, a flow chart 132, a tree view 134, or other map items 137. Similarly, recorder 124 illustratively generates a video 136 showing the steps that user 108 took in executing the process. Alternatively, user 108 can use process navigator/modifier component 120 to generate or modify a flow diagram or tree view corresponding to the process as well.

Once a map 116 is generated, user 108 can use process navigator/modifier component 120 to not only navigate the process, but to modify it by adding or deleting tasks or activities in the process and by assigning security roles as well. Based on any modifications made to the already-existing process map, component 120 can generate a fit gap list 118 that shows work items that need to be completed in order to modify the already-existing process so that it meets the modified process map generated by user 108.

Figure 2:
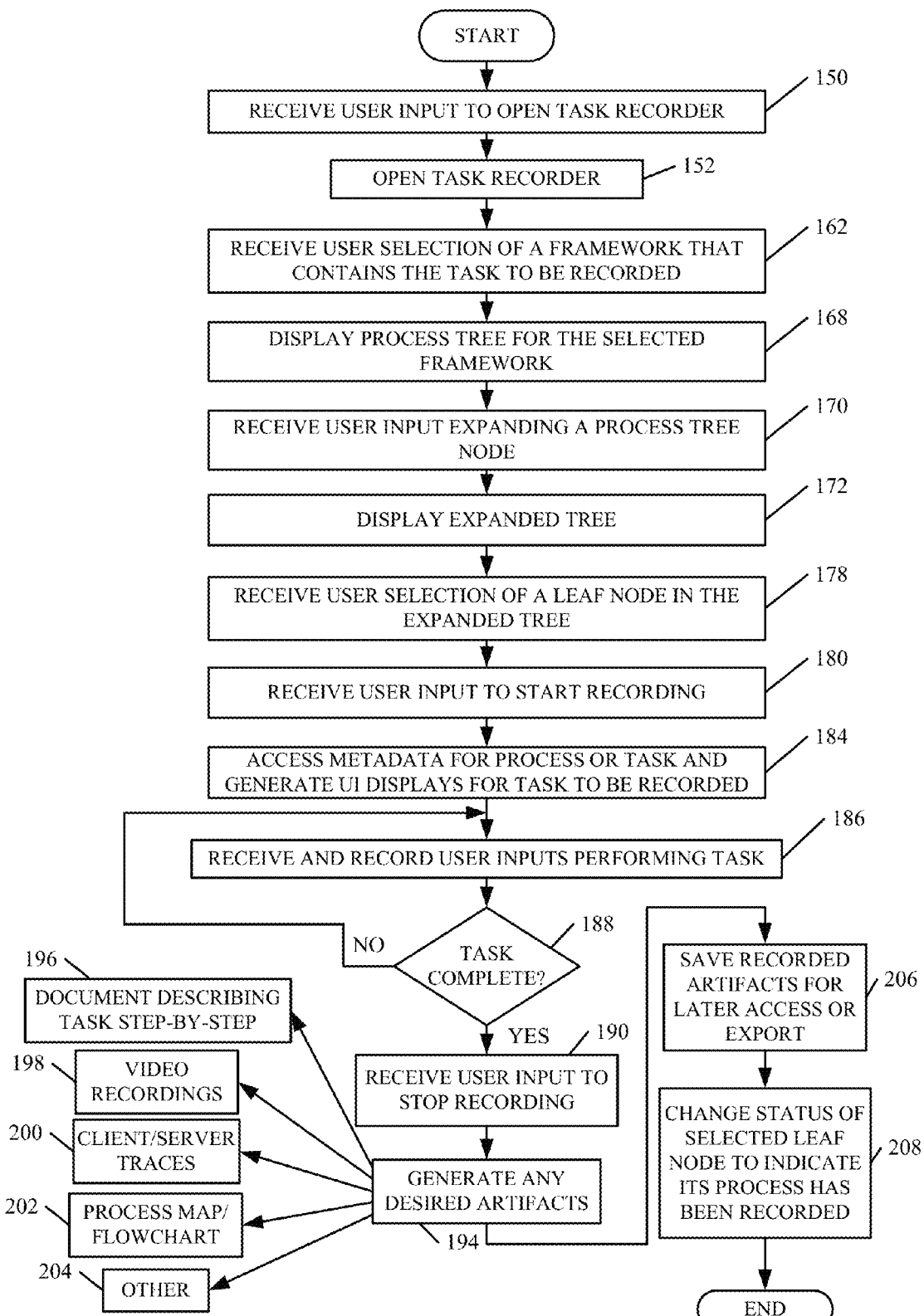
FIG. 2 is a flow diagram illustrating one embodiment of the operation of the solution process mapping system shown in FIG. 1 in recording a process and generating a map for the process.

FIG. 2 is a flow diagram illustrating one embodiment of the operation of recorder component 124 in recording an already-existing process and generating a map for that process, in more detail. FIGS. 2A-2G are exemplary user interface displays that can be generated for user 108, in order to make the recording. FIGS. 2-2G will now be described in conjunction with one another.

System 100 first receives a user input from user 108, through user input mechanism 130 on user interface display 106, in order to open task recorder component 124. This is indicated by block 150 in FIG. 2.

System 102 then uses user interface component 128 to open task recorder component 124 and generate a user interface display that allows user 108 to control task recorder component 124. This is indicated by block 152 in FIG. 2.

Figure 2A:
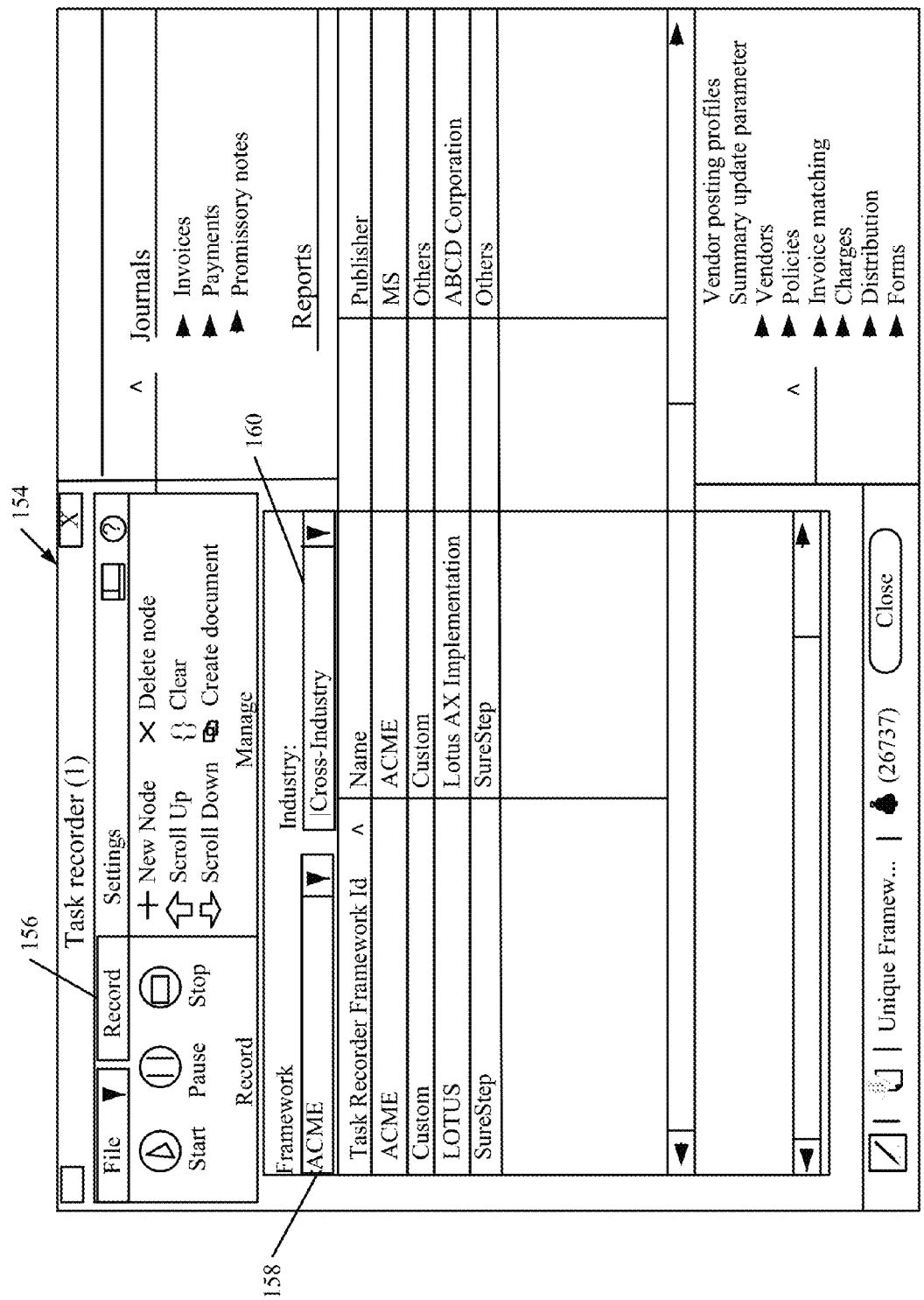

The user interface display illustratively allows user 108 to select a framework that contains the task to be recorded. FIG. 2A shows one exemplary user interface display 154. Recorder component 124 illustratively generates user interface display 154 using user interface component 128. User interface display 154 shows that the task recorder is open and a record tab 156 has been selected. Record tab 156 illustratively includes user input mechanisms (such as buttons) that allow the user to start, pause, and stop recording.

User interface display 154 also illustratively includes a framework selector 158 that allows user 108 to select a framework, either by typing it in a text box or by actuating a dropdown menu and selecting it from that menu. Similarly, user interface display 154 illustratively includes an industry selector 160. Industry selector 160 also illustratively allows user 108 to select an industry by typing in a text box or selecting from a dropdown menu. In the embodiment shown in FIG. 2A, the user has selected the "ACME" framework and a cross-industry selection for the industry designator. Receiving the user selection of a framework (and possibly an industry) that contains the task to be recorded is indicated by block 162 in FIG. 2.

Figure 2B:
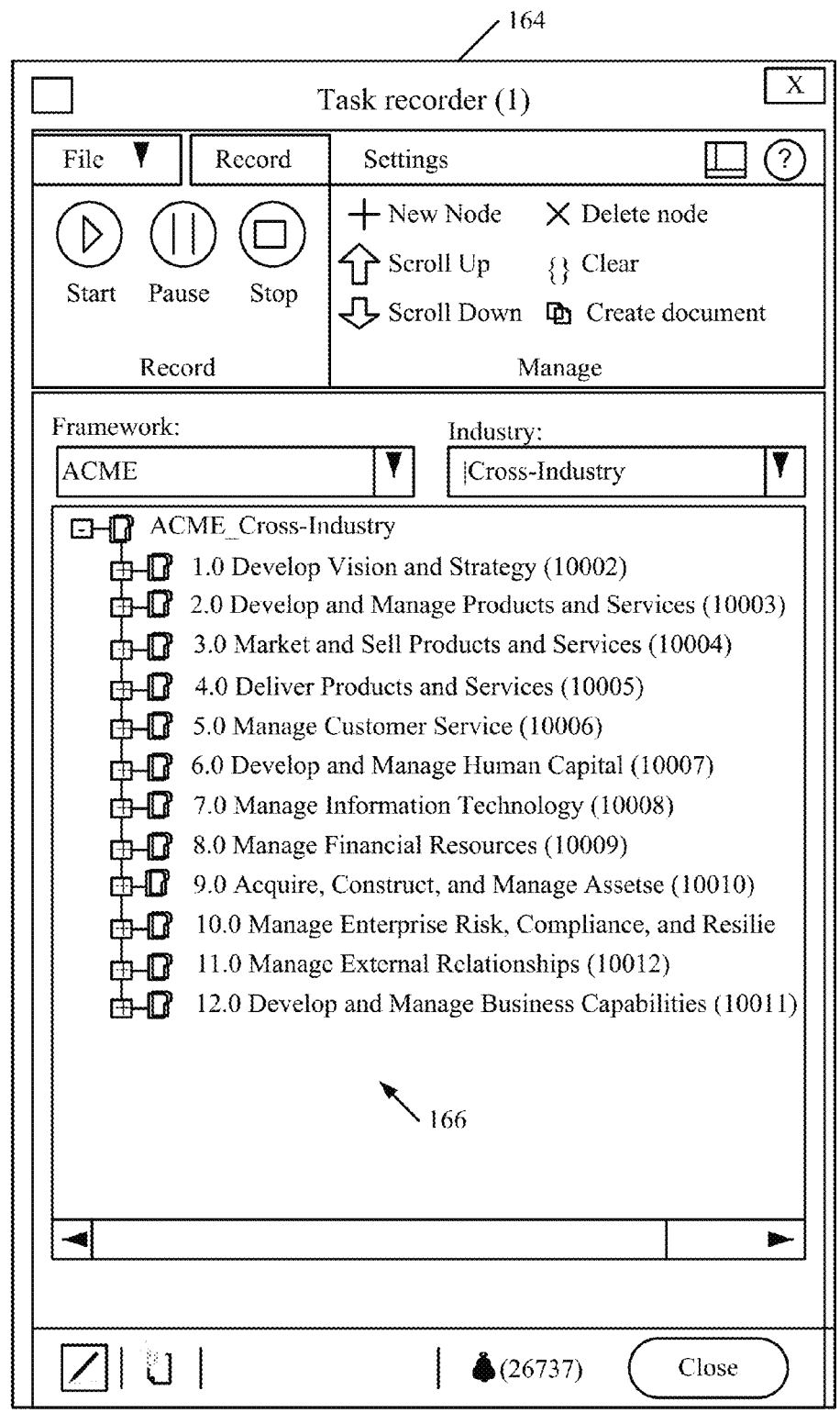

Recorder component 124 then accesses the various already-existing processes for the designated framework and industry and displays a process tree for the selected framework. FIG. 2B shows one exemplary user interface display 164 in which a process tree 166 is displayed for the selected framework and industry. Process tree 166 illustratively includes a plurality of hierarchically arranged nodes which can be expanded or collapsed to show additional nodes. Displaying process tree 166 for the selected framework is indicated by block 168 in FIG. 2.

User 108 then illustratively expands the process tree 166 and the expanded tree (showing hierarchically arranged nodes) is displayed. Receiving the user input expanding the process tree is indicated by block 170 in FIG. 2, and displaying the expanded tree is indicated by block 172.

Figure 2C:
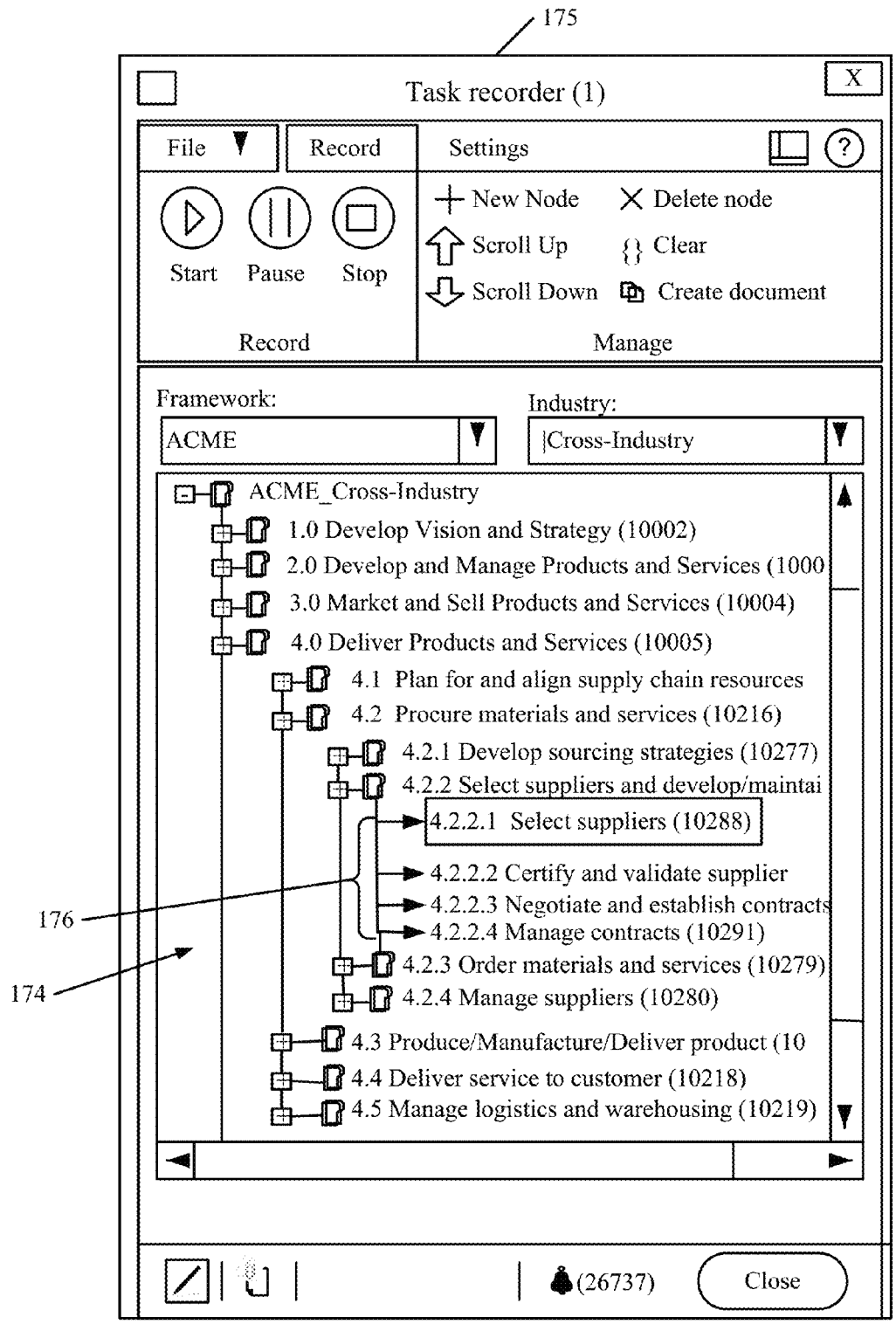

FIG. 2C shows an expanded tree 174 that has a plurality of hierarchically arranged nodes. Descendent nodes are indented relative to ancestor nodes. Tree 174 displays four leaf nodes 176. FIG. 2C also shows that the user has selected the highlighted leaf node 176. Receiving user selection of a leaf node in the expanded tree is indicated by block 178 in FIG. 2.

Figure 2D:
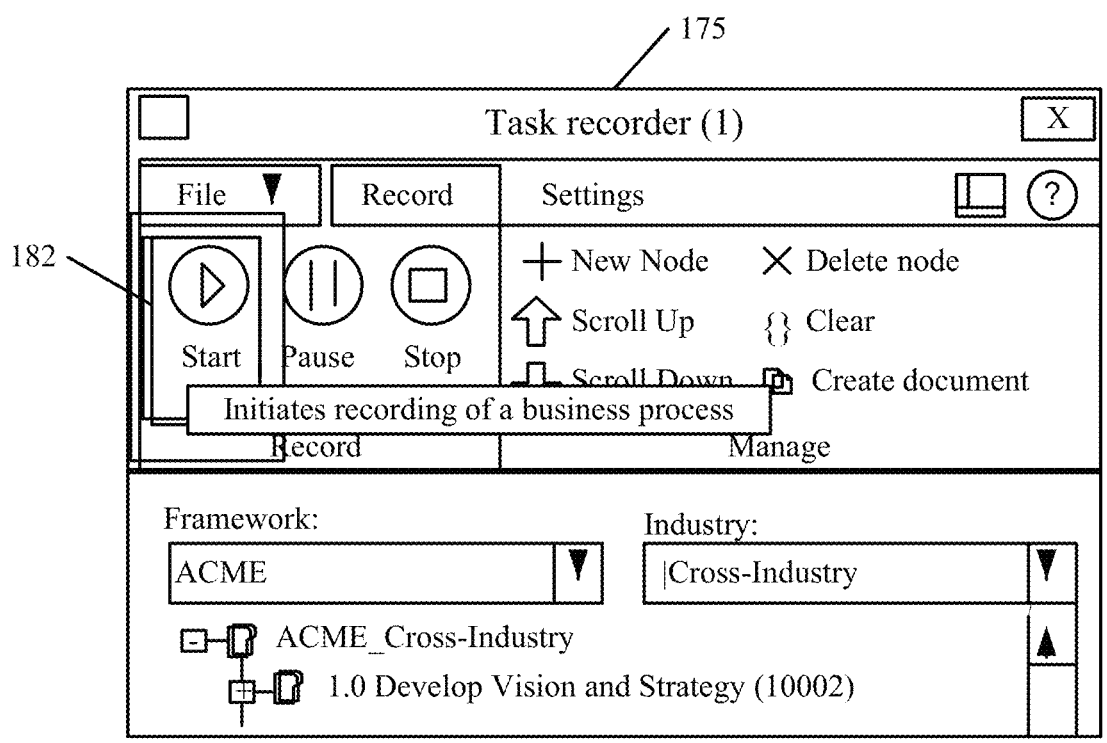

User 108 then provides a user input to start recording the process corresponding to the highlighted leaf node 176. This is indicated by block 180 in FIG. 2. FIG. 2D shows a portion of user interface display 175 shown in FIG. 2C, except that it also indicates that the start button 182 has been actuated by the user.

In response, recorder component 124 (or another component in system 102) generates the use interface displays for the task corresponding to the highlighted leaf node 176. This is indicated by block 184 in FIG. 2. The user can then actuate user input mechanisms on those user interfaces, in order to perform the task corresponding to the highlighted leaf node. All the while, recorder component 124 is recording not only a visual record, but also metadata, corresponding to each user input step (or operation) that is performed by user 108 on those user interface displays. Receiving and recording the user inputs in performing the task is indicated by block 186 in FIG. 2. This continues until user 108 has completed the task being recorded as determined at block 188 in FIG. 2.

Figure 2E:
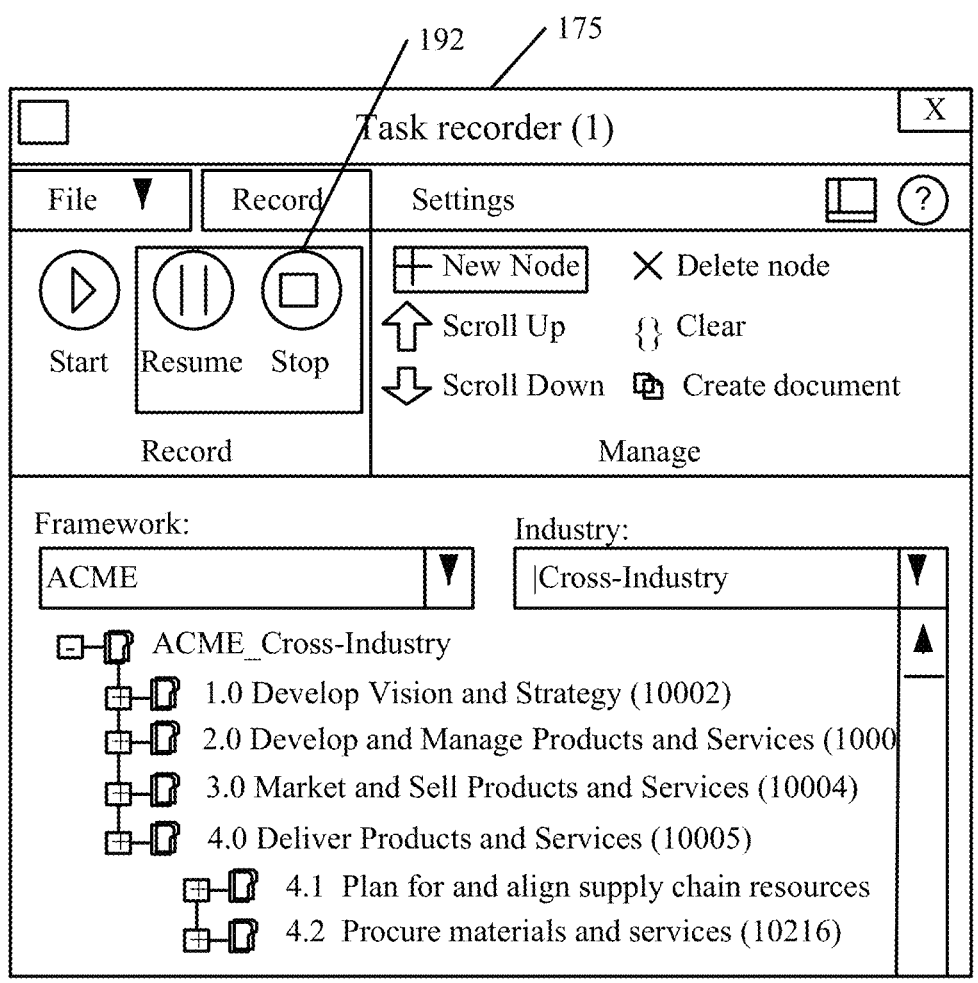

Once the user can completed the task, the user illustratively provides a user input to stop recording. This is indicated by block 190 in FIG. 2. FIG. 2E shows one embodiment of a user interface display illustrating this. FIG. 2E shows a portion of user interface display 175, except that FIG. 2E shows that the user has now actuated the stop button 192. This stops the recording.

Either during the recording, or after the recording is complete, recording component 124 (or another component of system 102) illustratively generates any desired artifacts for the recorded task. This is indicated by block 194 in FIG. 2. By way of example, one artifact that can be generated is a textual document 196 describing how to perform the task, step-by-step. Similarly, an artifact can be a video recording 198 which can be played back by the user 108 or a different user, which visually shows how the user performed the task on the user interface displays. The artifacts can include client/server traces 200, a process map or flowchart 202 (which will be described in greater detail later) or any other desired artifacts 204.

Once the desired artifacts are generated, they are illustratively saved for later access or export. This is indicated by block 206 in FIG. 2. Recorder component 124 then illustratively changes a status indicator corresponding to the task represented by the leaf node that was selected by the user at block 178. The status indicator now indicates that a recording has been made for the corresponding process (or task). This is indicated by block 208 in FIG. 2.

Figure 2F:
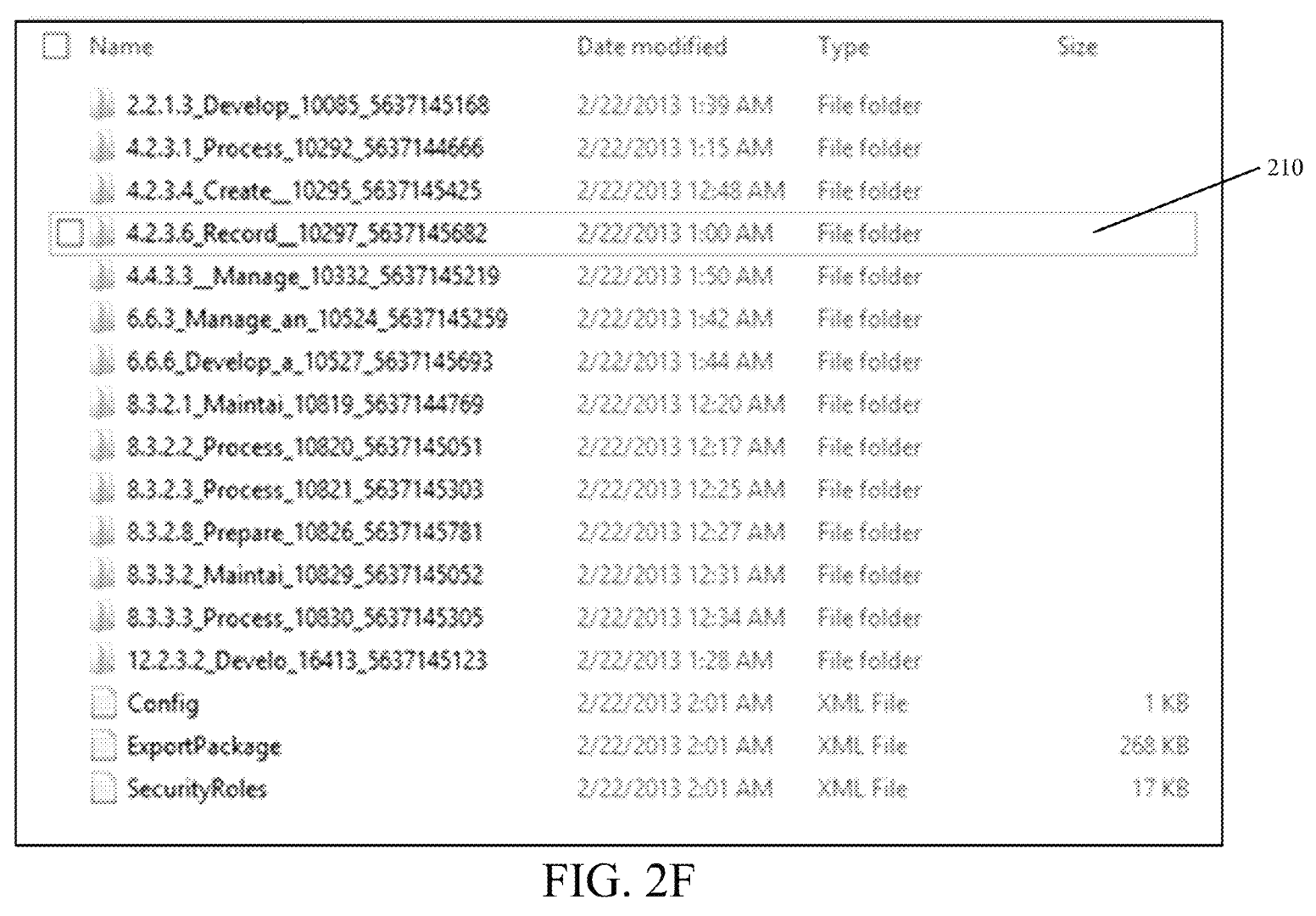

In order to view the recorded artifacts, the user illustratively selects the recording corresponding to the task that was recorded. This can be done in a variety of different ways. For instance, system 102 can generate a list that shows the various recordings corresponding to the various leaf nodes displayed in FIG. 2C. FIG. 2F shows one embodiment of such a display. It can be seen that the user has selected a recording 210 from the list in FIG. 2F. When the user actuates the selected recording, the artifacts generated during that recording are displayed, such as those shown in FIG. 2G. FIG. 2G shows a list of recorded artifacts including a step-by-step description of the process or task that was recorded as indicated by 196, the video recording 198, traces or events on the client or server side as indicated by 200, and a process map or flowchart 202. Of course, the other or different artifacts 204 can also be listed, if they are generated.

Figure 3:
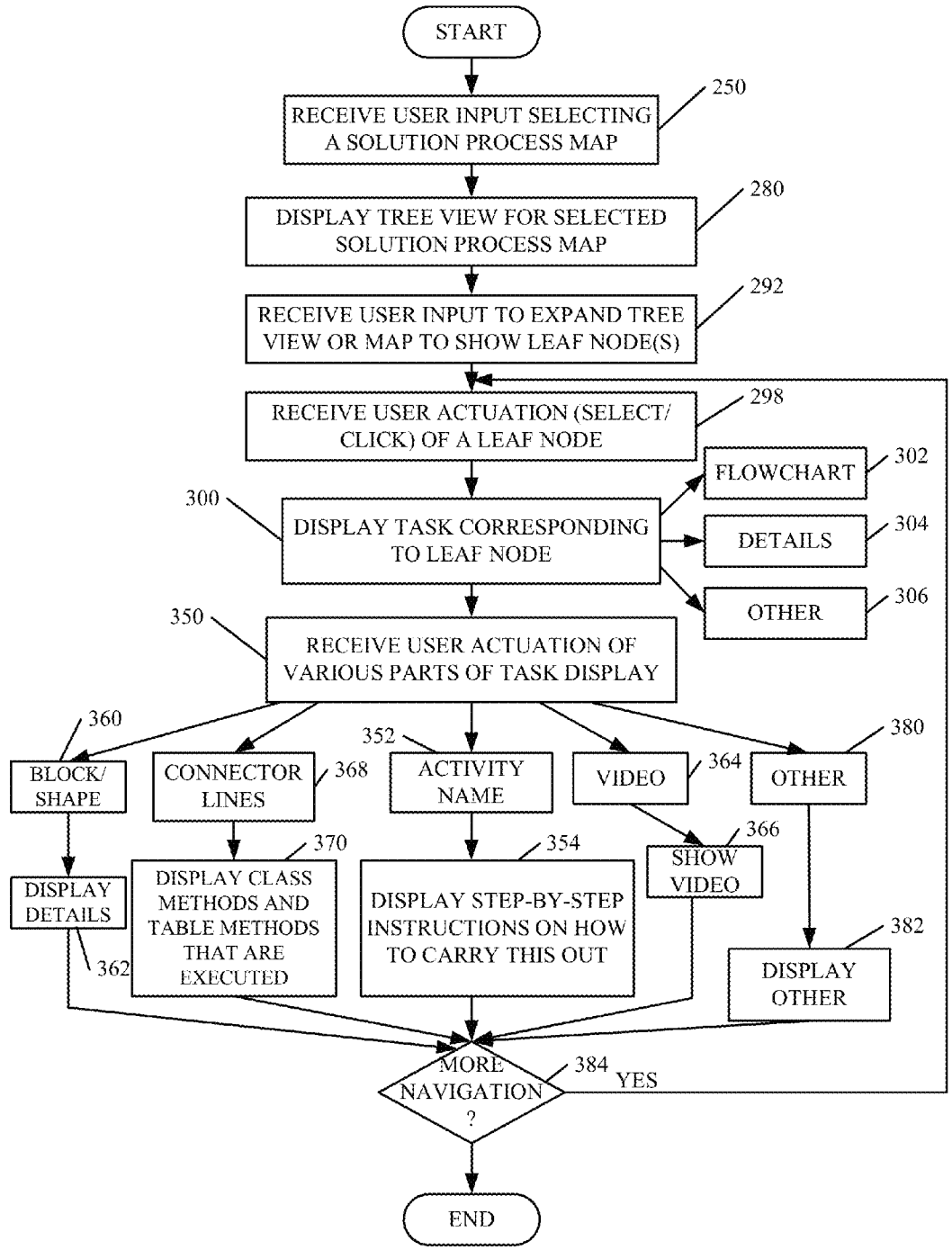
FIG. 3 is a flow diagram illustrating one embodiment of the operation of the solution process mapping system shown in FIG. 1 in facilitating navigation of a process map by a user.

FIG. 3 is a flow diagram illustrating one embodiment of the operation of process navigator/modifier component 120 in allowing user 108 to navigate an already-existing process map. FIGS. 3A-3E are illustrative user interface displays. FIGS. 3-3E will now be described in conjunction with one another.

User 108 first provides appropriate user inputs on user interface displays 106 so that user 108 can access system 102 and select a process map for navigation. This is indicated by block 250 in FIG. 3.

Figure 3A:
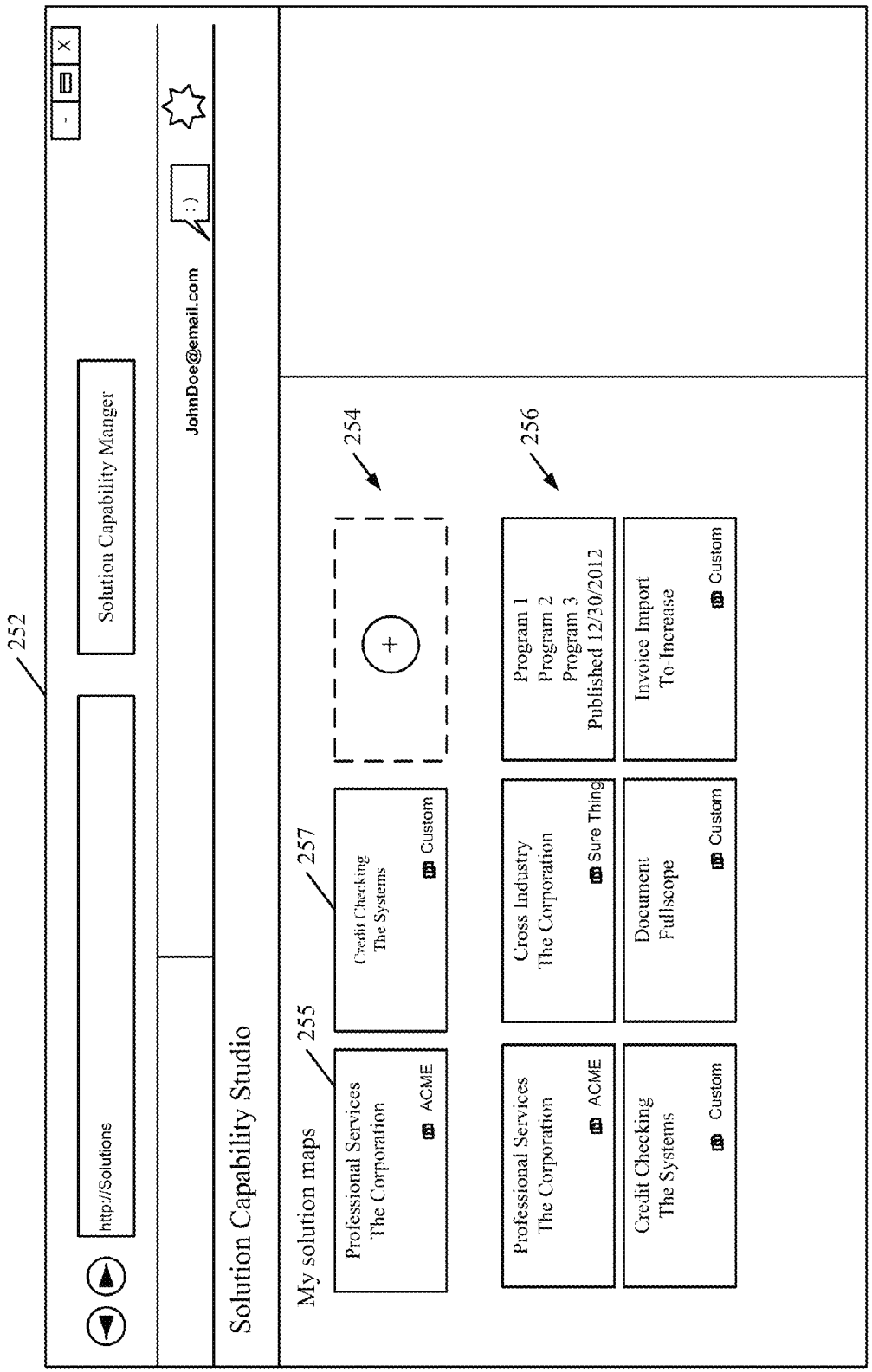
FIGS. 3A-3E are illustrative user interface displays.

FIG. 3A shows one embodiment of a user interface display 252 that can be used to do this. User interface display 252 illustratively includes a section of different categories of processes that have existing maps 254 that can be selected by user 108. FIG. 3A shows two categories 255 and 257 that have processes with existing maps. User interface display 252 also illustratively includes a section 256 that allows the user to select a specific industry or category of processes for creating a new map. A new map can be generated in much the same way as an existing map is modified. This is described in detail below.

However, in order to navigate an existing map, the user illustratively actuates one of input mechanisms 255 or 257 under the existing maps section 254 of display 252. This causes component 120 to generate a hierarchical tree view of processes that correspond to the categories represented by the mechanism 255 or 257 that was actuated by the user. These actuators represent categories of business processes 112 in an ERP instance for which solution maps 116 already exist.

Figure 3B:
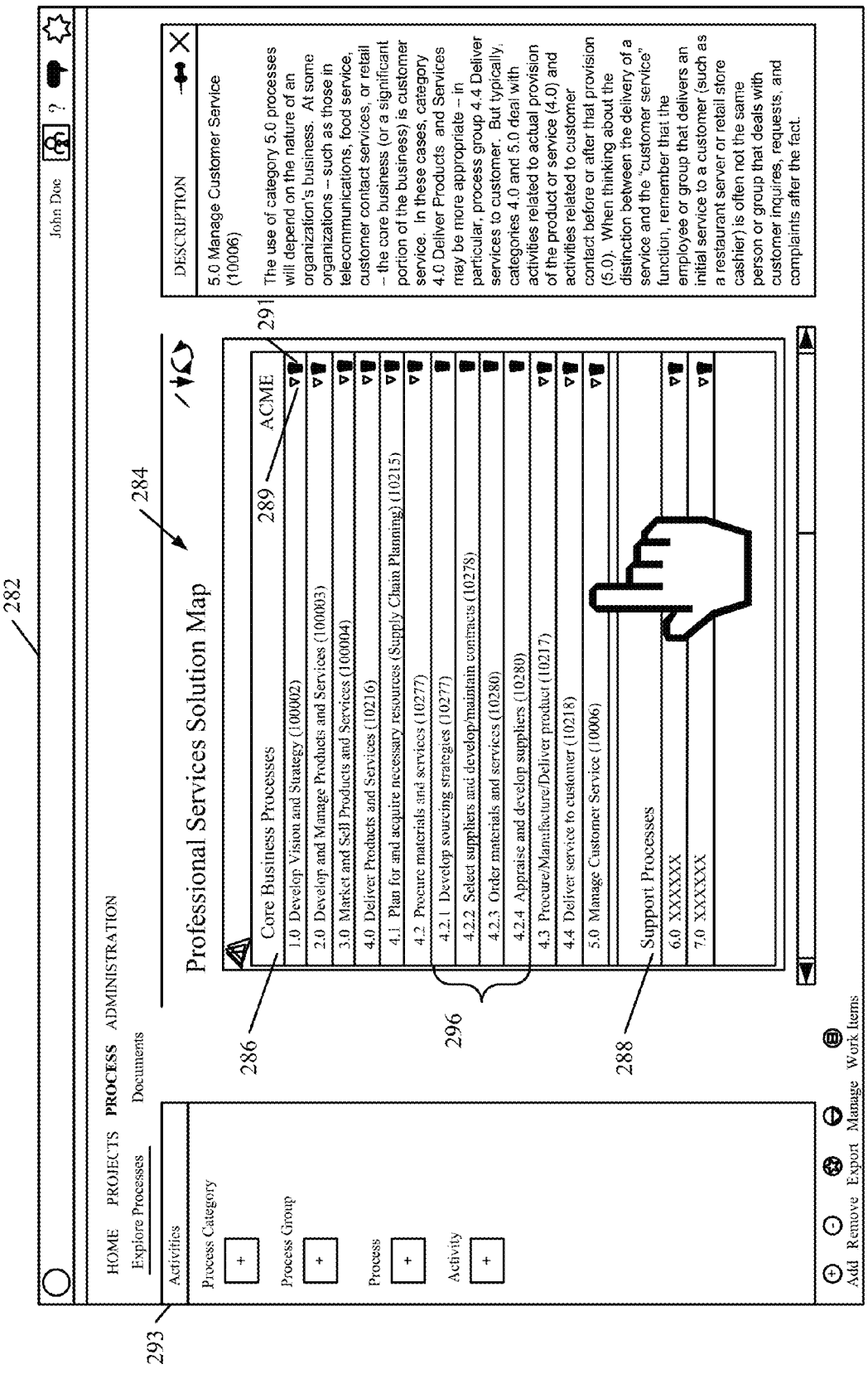

In response, process navigator/modifier component 120 generates a user interface display of a tree view of the processes selected by the user. Displaying the tree view is indicated by block 280 in FIG. 3. FIG. 3B shows one embodiment of a user interface display 282 that shows a tree view 284 of the various processes that have been mapped. The hierarchical tree view 284 illustratively has expansion and delete mechanisms 289 and 291, respectively. Expansion mechanisms 289 can be actuated to expand the tree to show leaf nodes. Delete mechanism 291 can be actuated to delete a node. In addition, in one embodiment, the processes are broken into categories, such as core business processes 286 and support processes 288. When the user selects one of the nodes in the tree view, a description pane 290 is updated to show a relatively detailed description of the processes corresponding to the node that has been selected by the user.

Process navigator/modifier component 120 then receives user inputs to expand the tree view 284 to show leaf nodes. This is indicated by block 292 in FIG. 3. The tree view 284 shown in FIG. 3B has already been expanded to show leaf nodes 296.

Component 120 then receives user selection and actuation of one of leaf nodes 296. This is indicated by block 298 in FIG. 3. In response, component 120 displays the task corresponding to the actuated leaf node. This is indicated by block 300. The display can include a flowchart 302, various other details 304 corresponding to the task or other information 306.

Figure 3C:
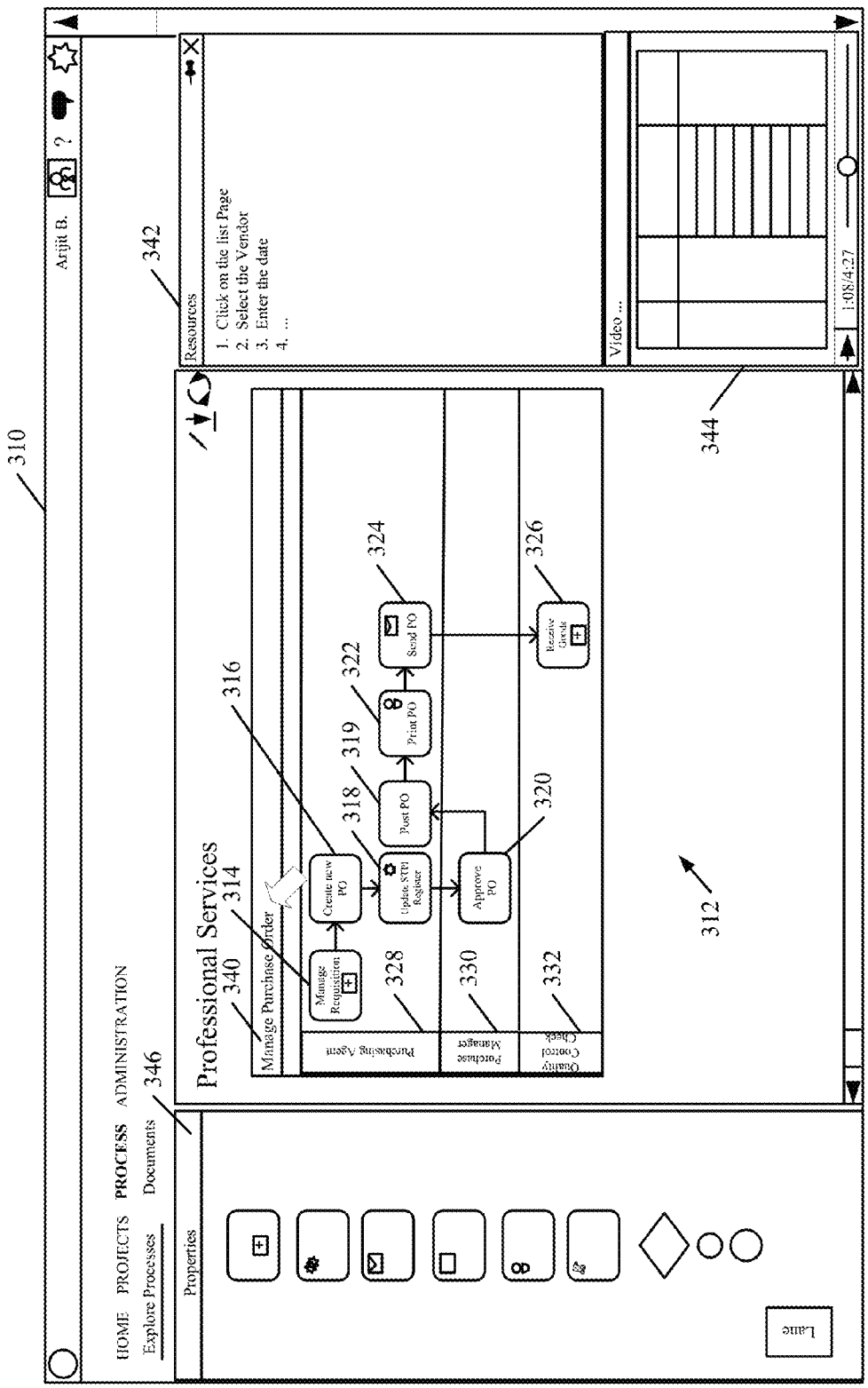

FIG. 3C shows one embodiment of a user interface display 310 showing a flow diagram 312 for a selected leaf node in FIG. 3B. Flow diagram 312 includes boxes or shapes 314, 316, 318, 319, 320, 322, 324 and 326. Each shape corresponds to an activity or task that is performed in order to implement the process represented by flowchart 312. Flowchart 312 is also shown divided into security lanes 328, 330 and 334. The security lanes each represent a security role that is needed in order to perform the activities or tasks represented by shapes 314-326. For instance, it can be seen that shape 320 is in security lane 330. This means that the "Approve Purchase Order" activity is to be performed by an individual having a security role corresponding to "Purchase Manager". The security role of the lane in which a given shape resides in the security role assigned to that task or activity.

Once the user interface display 310 is displayed, the user can click on various parts of the user interface in order to perform different actions, or to view different information. Receiving user actuation of various parts of the user interface display 310 is indicated by block 350 in FIG. 3.

FIG. 3C specifically shows that the task corresponding to flowchart 312 is a task entitled "Manage Purchase Order". When the user clicks on the "Manage Purchase Order" name shown at 340, a properties display 342 lists the step-by-step instructions for performing the "Manage Purchase Order"

task. In addition, a video portion 344 allows a user to view a video of another user actually performing the task on the user interfaces of the corresponding instance of the ERP system 110. Actuating the activity name 340 is indicated by block 352 in FIG. 3 and displaying the step-by-step instructions on how to carry out the task is indicated by block 354.

User interface display 310 also includes a properties bar 346. User 108 can modify the flowchart 312 by dragging and dropping shapes from properties bar 346 onto the canvas where flowchart 312 is displayed. This is described in greater detail below with respect to FIG. 4.

Figure 3D:
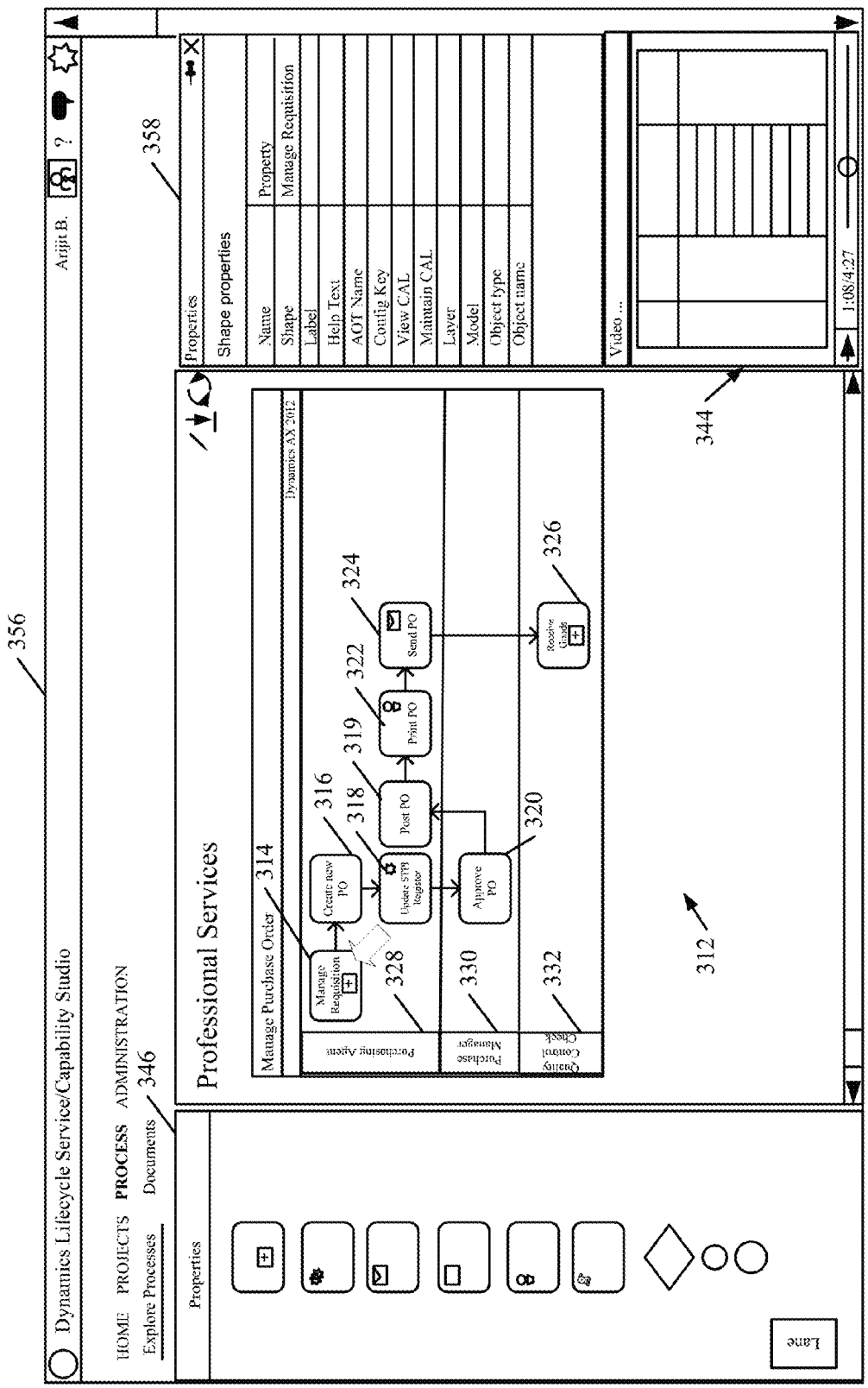
Figure 3E:
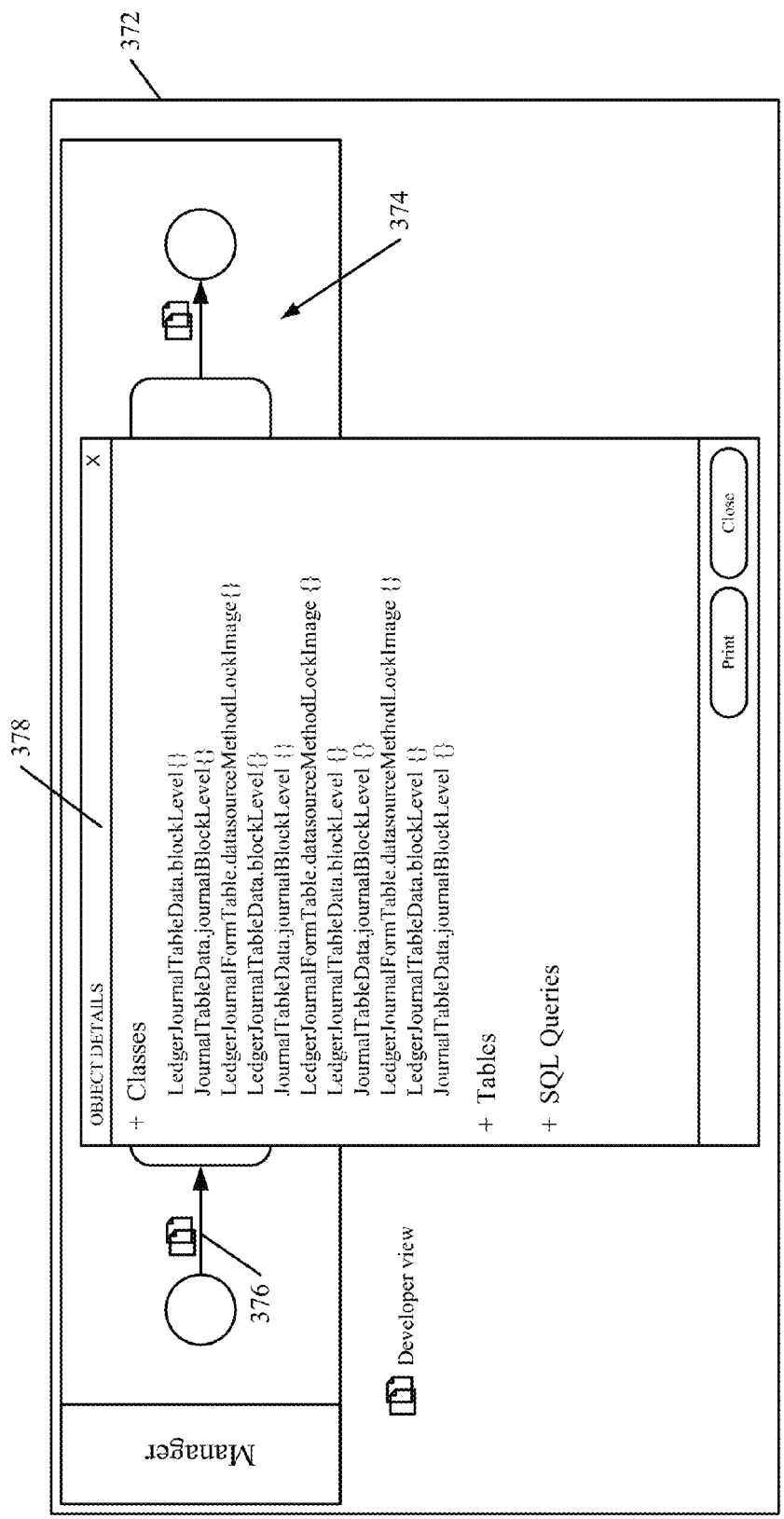

FIG. 3D shows a user interface display 356, which is similar to user interface display 310 shown in FIG. 3B and similar items are similarly numbered. However, user interface display 356 illustrates that the user has now clicked on the "Manage Requisition" block 314 in the flowchart 312. When this happens, component 120 displays property details corresponding to the activity represented by shape (or block) 314. The properties are displayed in property display section 358. In FIG. 3D, the properties include the shape, the label, help text corresponding to the activity, the name configuration key and a link to view or maintain the user license, the layer and model corresponding to the activity, as well as the object type and object name. Of course, the properties can include a wide variety of other information, such as the country or region, the security roles with permissions, the enabled workflows, and the names of the data sources, etc. Clicking on one of the blocks or shapes is indicated by block 360 in FIG. 3, and displaying the property details is indicated by block 362.

User 108 can also click on a start button on video portion 344 to watch a video of a user performing the task represented by flowchart 312. It should also be noted that, when the user actuates one of the shapes in flowchart 312, video portion 344 can be updated to display the part of the video display that corresponds to the activated shape. This, of course, is optional. Clicking on the video is indicated by block 364 in FIG. 3, and playing the video is indicated by block 366.

In one embodiment, the user can also click on one of the connector lines in flowchart 312. In that embodiment, component 120 displays the class methods and table methods that are executed when the process represented by flowchart 312 moves along that connector line. Actuating one of the connector lines is indicated by block 368 in FIG. 2 and displaying the class methods and table methods that are executed is indicated by block 370. FIG. 3E shows one embodiment of a user interface display 372 that illustrates this. It can be seen that a flowchart 374 is displayed in user interface display 372, and the user has actuated the connector line between the beginning of the flowchart and the first shape. This connector line is indicated at 376. When this occurs, component 120 illustratively generates a popup display 378 that shows the classes, tables and even database queries that can be performed as the process moves along connector line 376.

It will be noted that, in other embodiments, the user can click on other portions of the flowchart display. This is indicated by block 380 in FIG. 3. In that case, component 120 can display other information or take other actions as indicated by block 382.

User 108 can perform additional navigation through the process map, and this is determined at block 384 in FIG. 3. If the user 108 wishes to do so, processing continues at block 298 where the user can navigate to other flowcharts by clicking other leaf nodes in the tree view and the flowchart and task display will be generated for the new leaf node. However, if, at block 384, it is determined that no further navigation is desired, then the navigation is complete.

Figure 4:
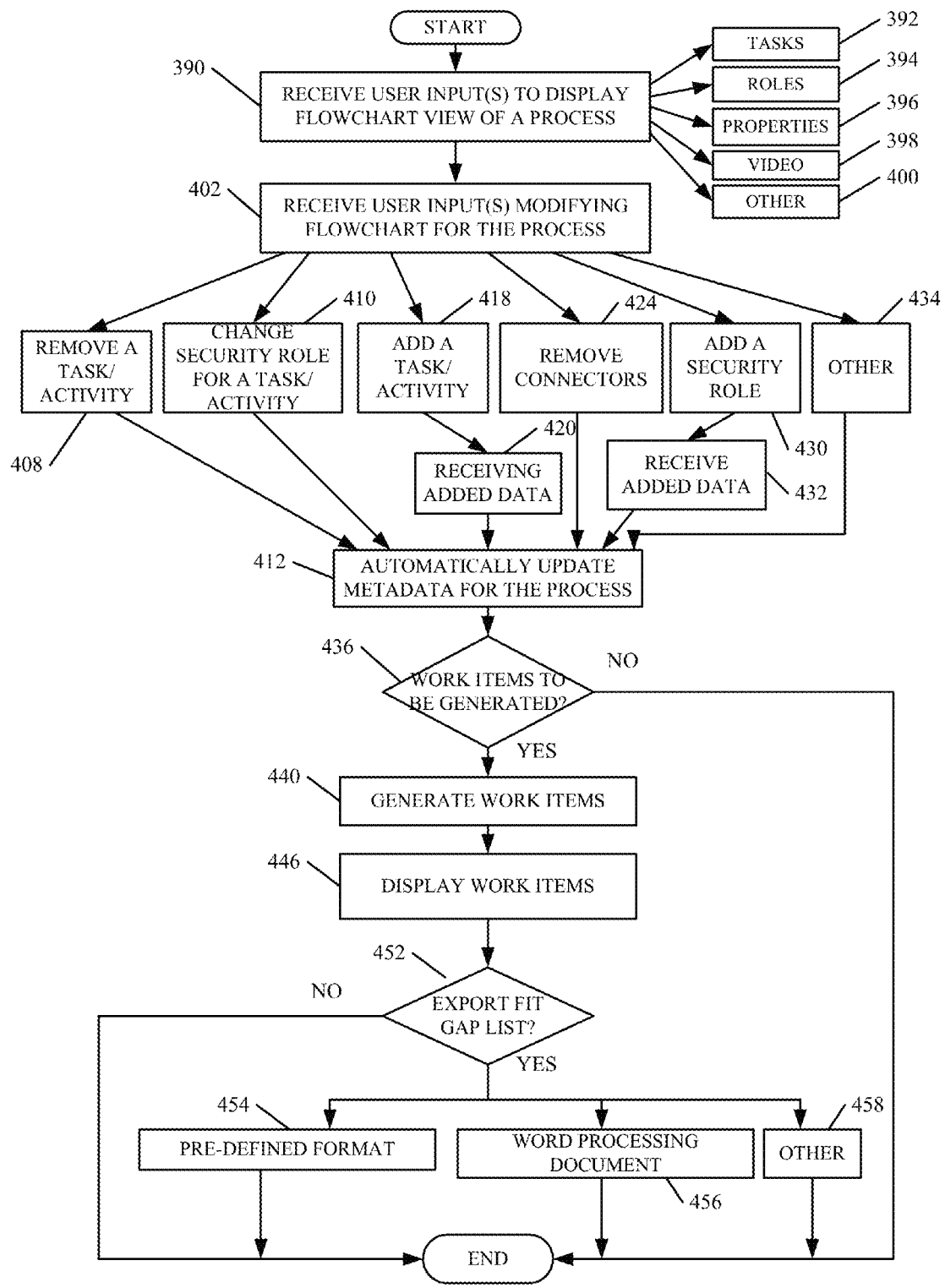
FIG. 4 is a flow diagram illustrating one embodiment of the operation of the system shown in FIG. 1 in modifying a process map from a flow chart view.

FIG. 4 is a flow diagram illustrating one embodiment of the operation of system 102 in generating modifications to a process from the flowchart view such as that shown in FIGS. 3C and 3D discussed above. First, as discussed above, process navigator/modifier component 120 generates user interface displays with user interface mechanisms to receive user inputs to display the flowchart view of a process. This is indicated by block 390 in FIG. 4. An example of this is user interface display 356 shown in FIG. 3D above. It can be seen that the flowchart view not only includes the activities or tasks represented by blocks 314-326 (as indicated by block 392 in FIG. 4) but it also includes the roles 394 associated with each of those blocks, properties 396 that are displayed for a selected block, video 398 (shown in video portion 344 of display 356) and it can, of course, include other information 400 as well.

Figure 4A:
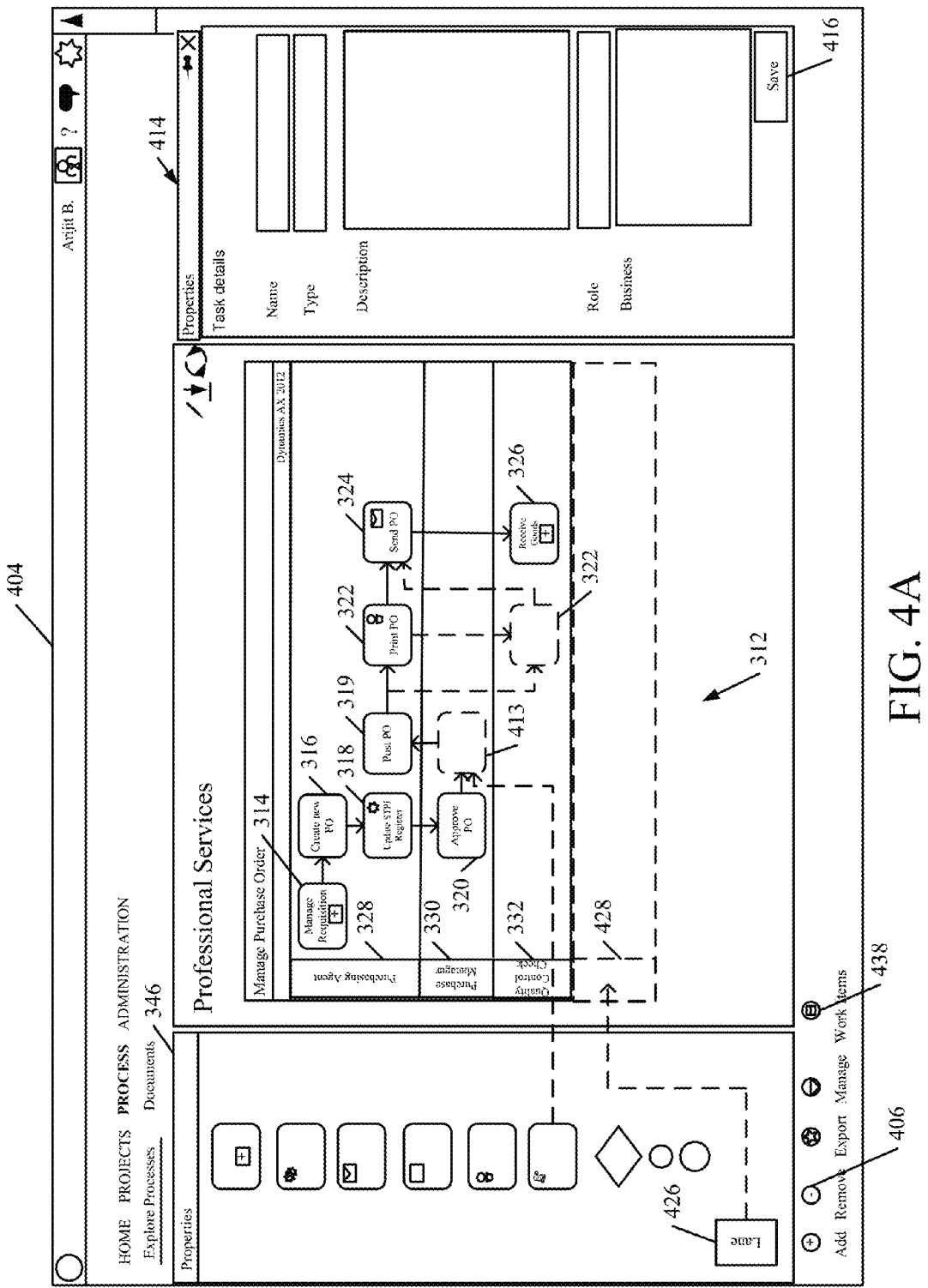

Component 120 then receives a user input modifying the flowchart corresponding to the underlying process. This is indicated by block 402 in FIG. 4. FIG. 4A shows a user interface display 404 that illustrates a number of different ways that a user can modify the process from the flowchart view. User interface display 404 is similar, in some ways, to user interface display 356 shown in FIG. 3D, and similar items are similarly numbered.

In one embodiment, user 108 desires to delete or remove one of the tasks or activities represented by a shape in flowchart 312. In that case, the user can simply select a shape and actuate the "remove" button 406 on user interface display 404. Removing a task or activity is indicated by block 408 in FIG. 4. Component 120 automatically updates the metadata corresponding to the process to indicate this. This is indicated by block 412 in FIG. 4.

In addition, user 108 can change a security role assigned to a task or activity corresponding to one of the shapes in flowchart 312. In one embodiment, the user simply drags a shape from its existing security lane 328, 330 and 332, to a different lane. For instance, in FIG. 4A, the user can click on shape 322 and drag it from "Purchasing Agent" security lane 328, to "Quality Control Clerk" security lane 332. In that case, security role component 126 automatically updates the metadata 114 corresponding to the task or activity to indicate that it has been assigned to a different security role. Changing the security role for a task or activity is indicated by block 410 in FIG. 4, and automatically updating the metadata to indicate the new security role is indicated by block 412.

User 108 can also add a task or activity to flow chart 112. This can be done, in one embodiment, by simply dragging a shape 413 from properties bar 346 onto the canvas where flowchart 312 is displayed. The user can then add connectors or modify the location of the existing connectors, to include the new shape. If the user has dragged and dropped a shape from properties bar 346 onto the canvas showing flowchart 312, component 120 generates a properties display 414 that allows the user to add data for the task or activity corresponding to the newly added shape. In the embodiment shown, the user can type in the name, type and description of the newly added task or activity, as well as the role and business corresponding to it. In another embodiment, the user can select these things from a dropdown menu (as shown for example by the type indicator).

The user can also automatically assign a security role to the newly added task or activity simply by placing it in one of the security lanes 328, 330 or 332. The user can save the new flowchart (with the newly added shape 413) by simply clicking the save button 416. This causes component 120 to automatically update the metadata corresponding to the process or task represented by flowchart 312 to include the new activity or task, along with the information added by the user in property section 414, and also including the security role assigned to the new task or activity by security role component 126. Adding a task or activity is indicated by block 418 in FIG. 4. Receiving the user-added data is indicated by block 420, and automatically updating the metadata is again indicated by block 412 in FIG. 4.

User 108 can also remove connectors from flowchart 312. This can be done by simply selecting a connector (such as by clicking on it) and either actuating a delete button (or remove button) 406. Again, the metadata corresponding to the process represented by flowchart 312 will be updated to remove the corresponding metadata as well. Removing the connectors is indicated by block 424 in FIG. 4 and again updating the metadata is indicated by block 412.

In one embodiment, user 108 can also add a security role to the process. In the embodiment shown in FIG. 4A, the user simply drags and drops the "lane" shape 426 from the properties bar 346 onto the canvas displaying flowchart 312. This causes a new security lane 428 to be added to the flowchart. The user can then add additional information in properties portion 414 to define the security role corresponding to the newly added security lane 428. Adding a security role is indicated by block 430 in FIG. 4, and receiving the user-added data corresponding to the new security role is indicated by block 432. Again, as with the other modifications to the process, the metadata corresponding to the process represented by flowchart 312 will be automatically updated by component 120 or 126 to identify the new security role. This is indicated by block 412.

The user can also illustratively modify the process in other ways, and the metadata will automatically be updated. This is indicated by blocks 434 and 412.

Based on the changes to the process represented by workflow 312, new work items may need to be generated. For instance, where a user 108 has added a task or activity to the process represented by flowchart 312, the underlying code for that task or activity may need to be generated, modified, or implemented for the process to operate properly. Therefore, a work item can be generated identifying what needs to be done. Similarly, where the user has added a new security role or made other modifications that require underlying work to be done, then work items need to be generated and completed in order for the process to operate as desired. Thus, process navigator/modifier component 120 determines whether work items are to be generated. This is indicated by block 436 in FIG. 4. It should be noted that, in one embodiment, the user can automatically have the work items generated as well, simply by actuating a suitable user input mechanism, such as work item button 438, on user interface display 404 shown in FIG. 4A.

Figure 4C:
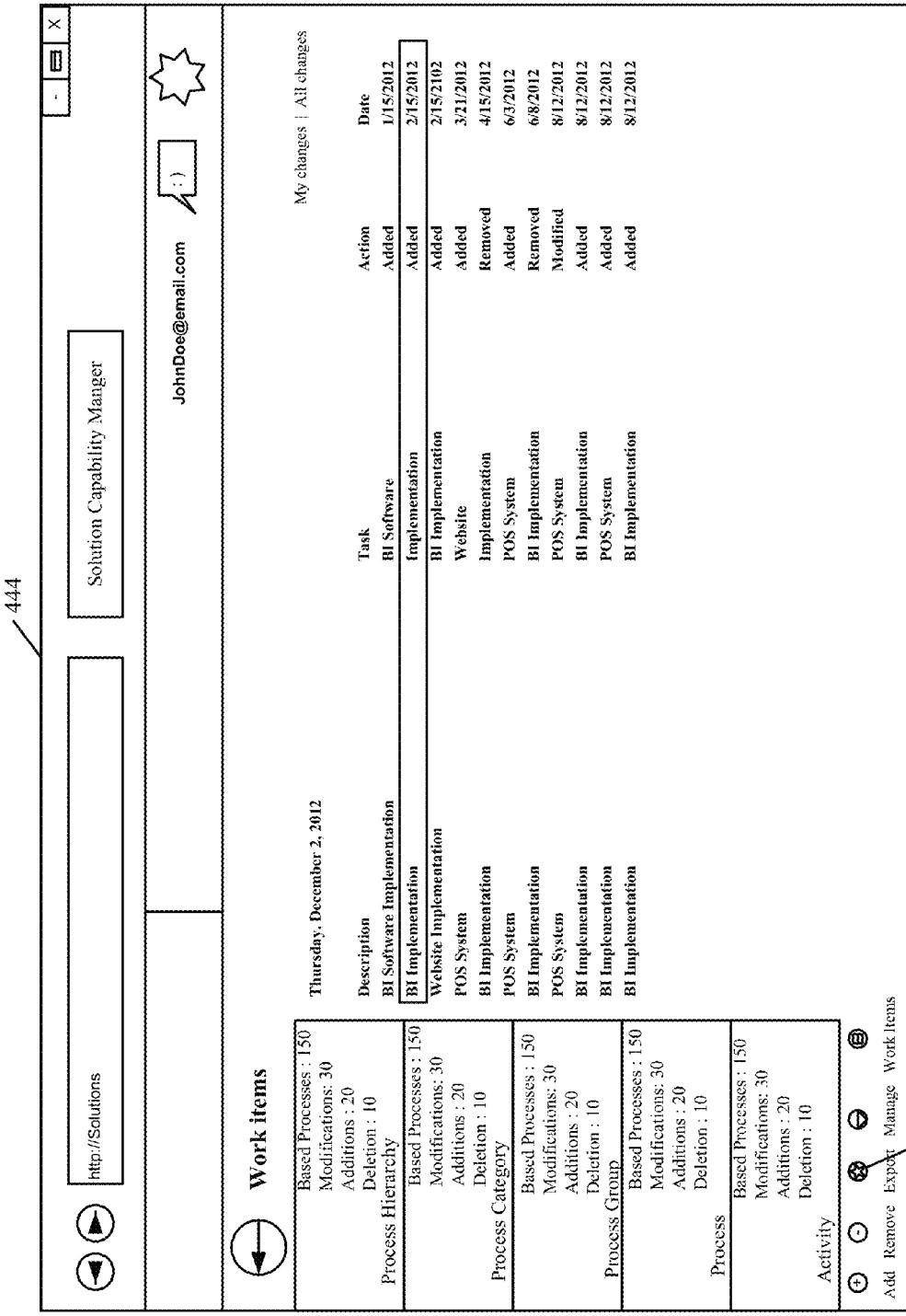

In any case, if work items are to be generated, then component 120 automatically generates the work items so they can be viewed, saved, or exported. This is indicated by block 440 in FIG. 4. FIGS. 4B and 4C show two different user interface displays 442 and 444, respectively, showing different work items. In one embodiment, user 108 or another project team member has made the various modifications discussed above, or other modifications, to the process hierarchy and these have been added to a gap list for the process tree. User 108 can then navigate to a documents section and see a list of all changes made by the user or the user's team members. Displaying the work items is indicated by block 446 in FIG. 4.

In one embodiment, user 108 can also export the work items in the form of a fit gap list. The user can illustratively do this by actuating a suitable user input mechanism, such as export button 448 in FIG. 4B or button 450 in FIG. 4C. Determining whether to export the work items in the form of a fit gap list is indicated by block 452 in FIG. 4. The fit gap list can be exported in a predefined format as indicated by block 454, or the work items can be exported as a word processing document 456, or in other ways 458 as well.

Figure 5:
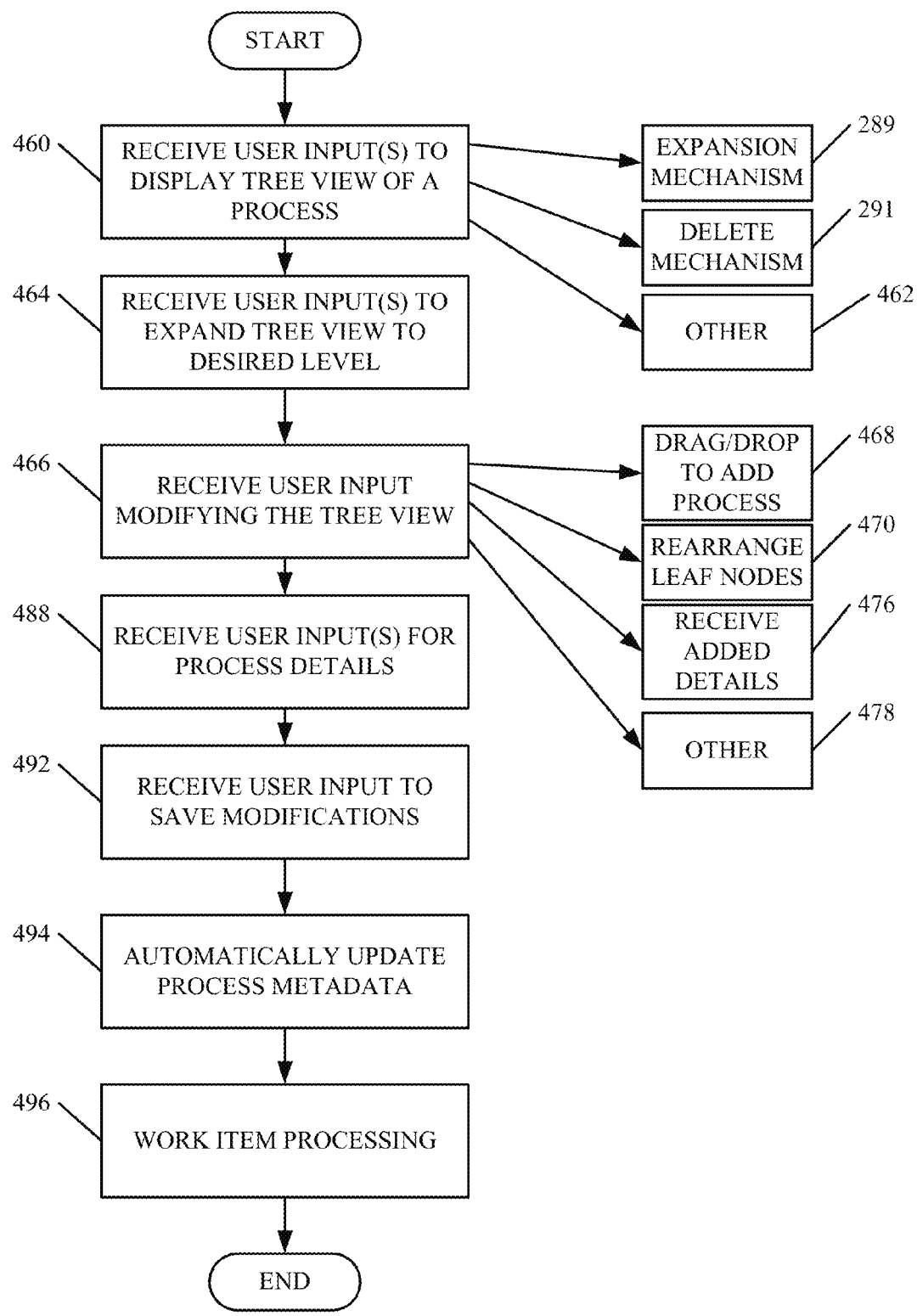
FIG. 5 is a flow diagram illustrating the operation of the system shown in FIG. 1 in modifying a process map from a tree view.

FIG. 5 is a flow diagram illustrating another way that user 108 can illustratively modify a process. Instead of modifying it from the flowchart view, FIG. 5 describes how the user can modify the process from the tree view (such as the expanded tree view shown in FIG. 3B). First, component 120 receives user inputs that are provided to navigate to, and display, the tree view of a process (such as user interface display 282 shown in FIG. 3B). Receiving these user inputs is indicated by block 460 in FIG. 5. It can be seen that the tree view includes the expansion mechanisms and delete mechanisms 289 and 291, respectively, as discussed above with respect to FIG. 3B. Of course, the tree view could include other items as well, as indicated by block 462.

In any case, component 120 receives user inputs to expand the tree view to a desired level. This is indicated by block 464.

Next, component 120 receives user inputs modifying the tree view. This is indicated by block 466, and it can be done in a variety of different ways. For instance, in the tree view, it can be seen that the activities pane 293 allows the user to drag and drop shapes from pane 293, into the tree view 284. This can be done to add an item to the tree view at the process category level, the process group level, the process level or the activity level, or any other desired level within the hierarchical tree structure 284. Receiving a drag and drop input to add an item to the process is indicated by block 468 in FIG. 5.

User 108 can also modify the tree structure simply by rearranging leaf nodes (such as leaf nodes 296 shown in FIG. 3B). For instance, if the user grabs the leaf node labeled 4.2.1, and drags it downwardly, it will be reinserted in a position where the user drops it. Rearranging the leaf nodes is indicated by block 470 in FIG. 5.

Figure 5A:
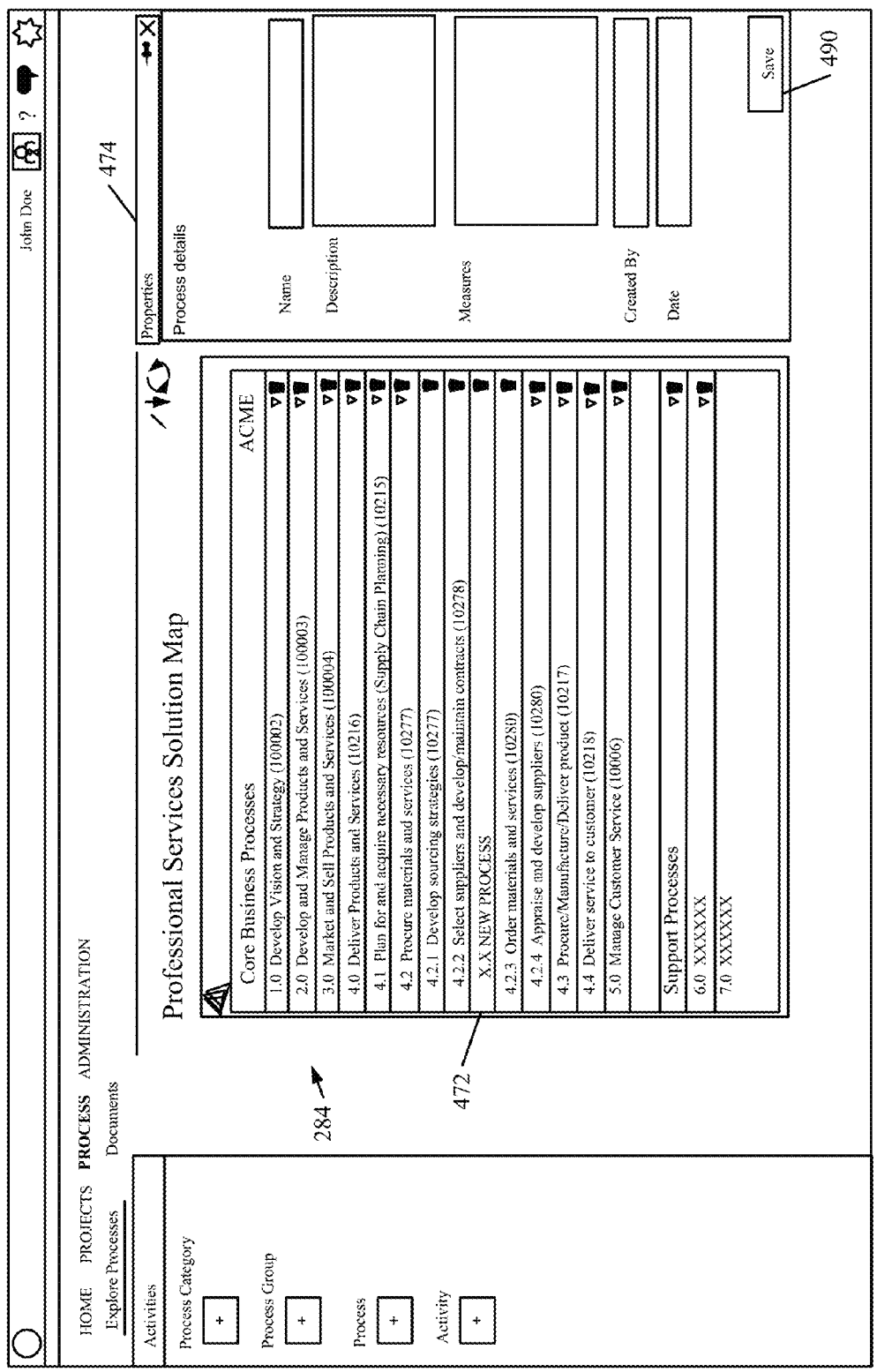
FIG. 5A is an illustrative user interface display.

FIG. 5A shows that the user has added a new process 472 in the hierarchical tree view 284. When this occurs, component 120 illustratively displays property section 474 which again allows the user to provide the name, description, and other information corresponding to the newly added node 472 in tree structure 284. Receiving these user-added details is indicated by block 476. Of course, it will be appreciated that user 108 can modify the tree structure in other ways as well, and this is indicated by block 478.

When the tree structure is modified, it may be that user 108 desires to input additional process details for the modified process. If so, receiving the user input for additional process details is indicated by block 488 in FIG. 5.

User 108 can then save the modified tree view 284 by actuating a suitable input mechanism. For instance, in one embodiment, the user simply actuates save button 490. Receiving the user input to save the modifications is indicated by block 492 in FIG. 5. Component 120 then automatically updates the process metadata corresponding to the modified process represented by tree view 284. This is indicated by block 494 in FIG. 5. Then, component 120 conducts the work item processing described above with respect to FIG. 4, and this is indicated by block 496 in FIG. 5. More specifically, in one embodiment, component 120 conducts the work item processing described above with respect to blocks 436, 440, 446, 452, 454, 456 and 458 in FIG. 4.

It can be seen that the system automatically identifies metadata corresponding to a process stored in an instance of a business data system and generates a visual representation (diagram) of the process based on the metadata. Modifications to the process can be received by the system and the metadata is automatically modified as well. It can be used by a variety of different tools. It can be output as a fit gap list, a document, in an XML schema, in another schema and it can be visualized in diagram form as well. The modifications can be made by modifying the diagram of the process on a user interface display.

Figure 6:
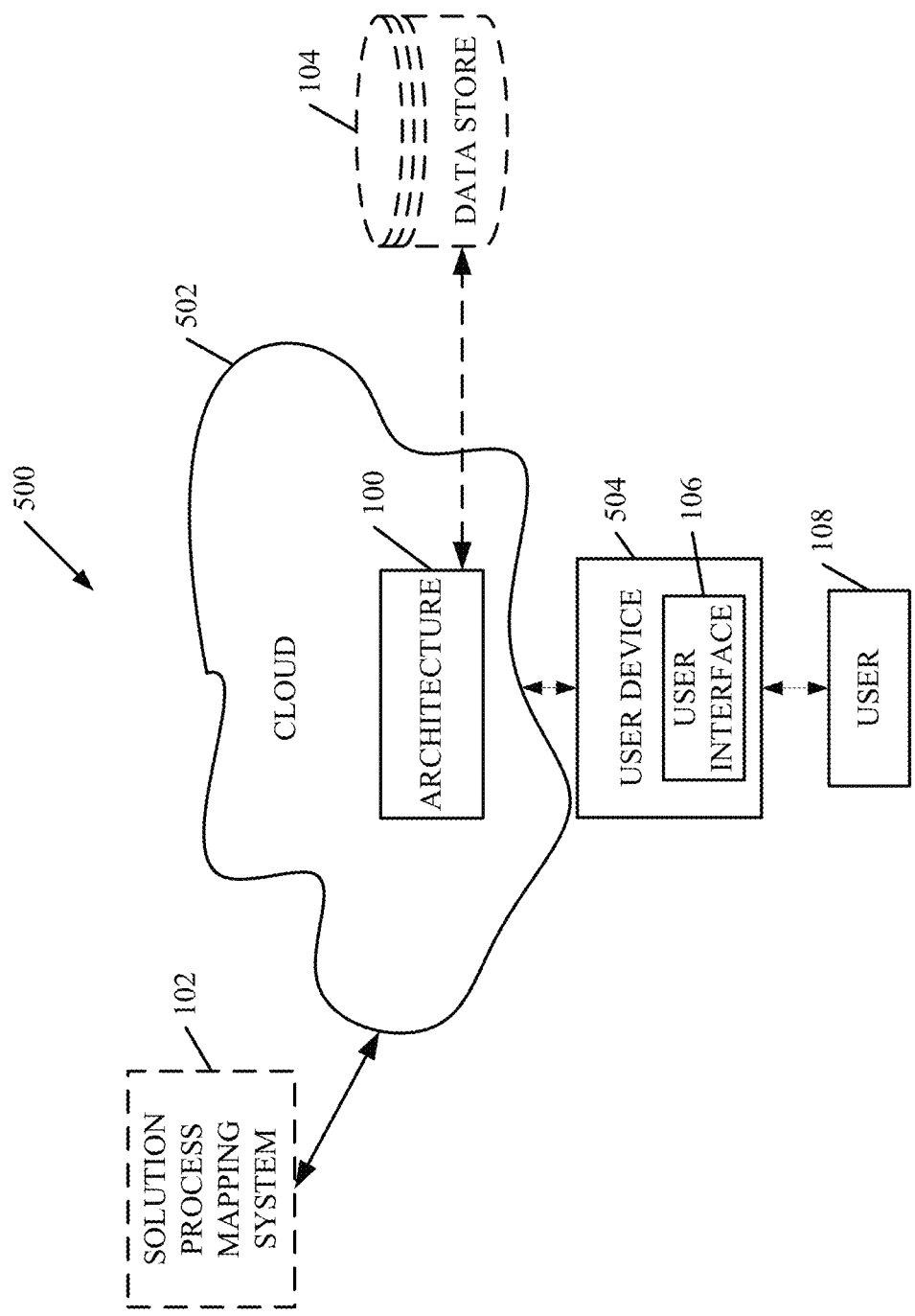
FIG. 6 is a block diagram showing one embodiment of the system in FIG. 1 in various architectures.

FIG. 6 is a block diagram of architecture 100, shown in FIG. 1, except that it is disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the Internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the embodiment shown in FIG. 6, some items are similar to those shown in FIG. 1 and they are similarly numbered. FIG. 6 specifically shows that system 102 is located in cloud 502 (which can be public, private, or a combination where portions are public while others are private). Therefore, user 108 uses a user device 504 to access those systems through cloud 502.

FIG. 6 also depicts another embodiment of a cloud architecture. FIG. 6 shows that it is also contemplated that some elements of architecture system 100 are disposed in cloud 502 while others are not. By way of example, data store 104 can be disposed outside of cloud 502, and accessed through cloud 502. In another embodiment, solution process mapping system 102 or architecture system 100 can be outside of cloud 502. Regardless of where they are located, they can be accessed directly by device 504, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 7:
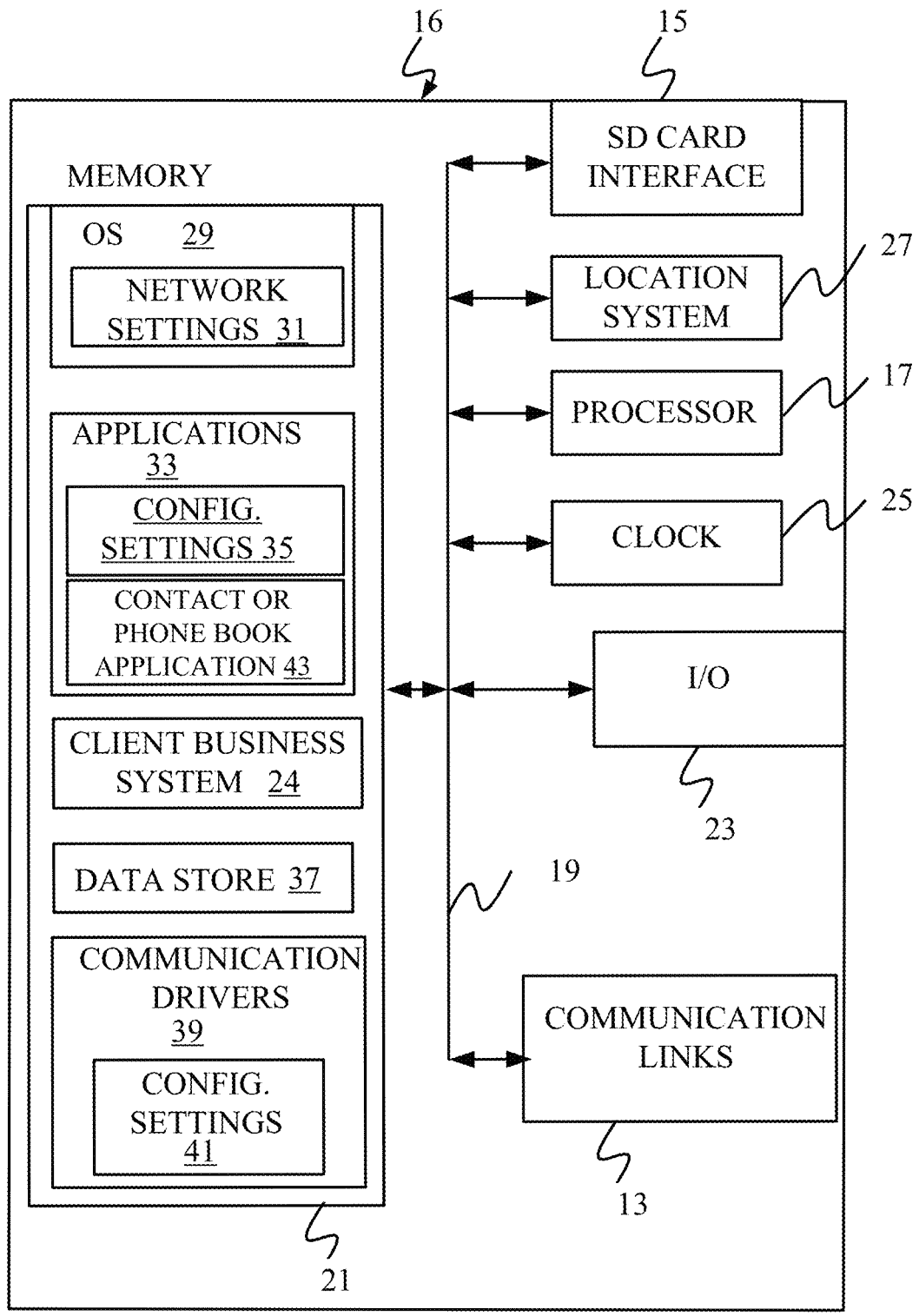
FIGS. 7-10 show illustrative mobile devices.

FIG. 7 is a simplified block diagram of one illustrative embodiment of a handheld or mobile computing device that can be used as a user's or client's hand held device 16, in which the present system (or parts of it) can be deployed. FIGS. 8-11 are examples of handheld or mobile devices.

FIG. 7 provides a general block diagram of the components of a client device 16 that can run components of architecture 100 or that interacts with architecture 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as 802.11 and 802.11b (Wi-Fi) protocols, and Bluetooth protocol, which provide local wireless connections to networks.

Under other embodiments, applications or systems (like system 102) are received on a removable Secure Digital (SD) card that is connected to a SD card interface 15. SD card interface 15 and communication links 13 communicate with a processor 17 (which can also embody processors 122 from FIG. 1) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. System 102 or the items in data store 104, for example, can reside in memory 21. Similarly, device 16 can have a client business system 24 which can run various business applications or embody parts or all of architecture 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

Figure 8:
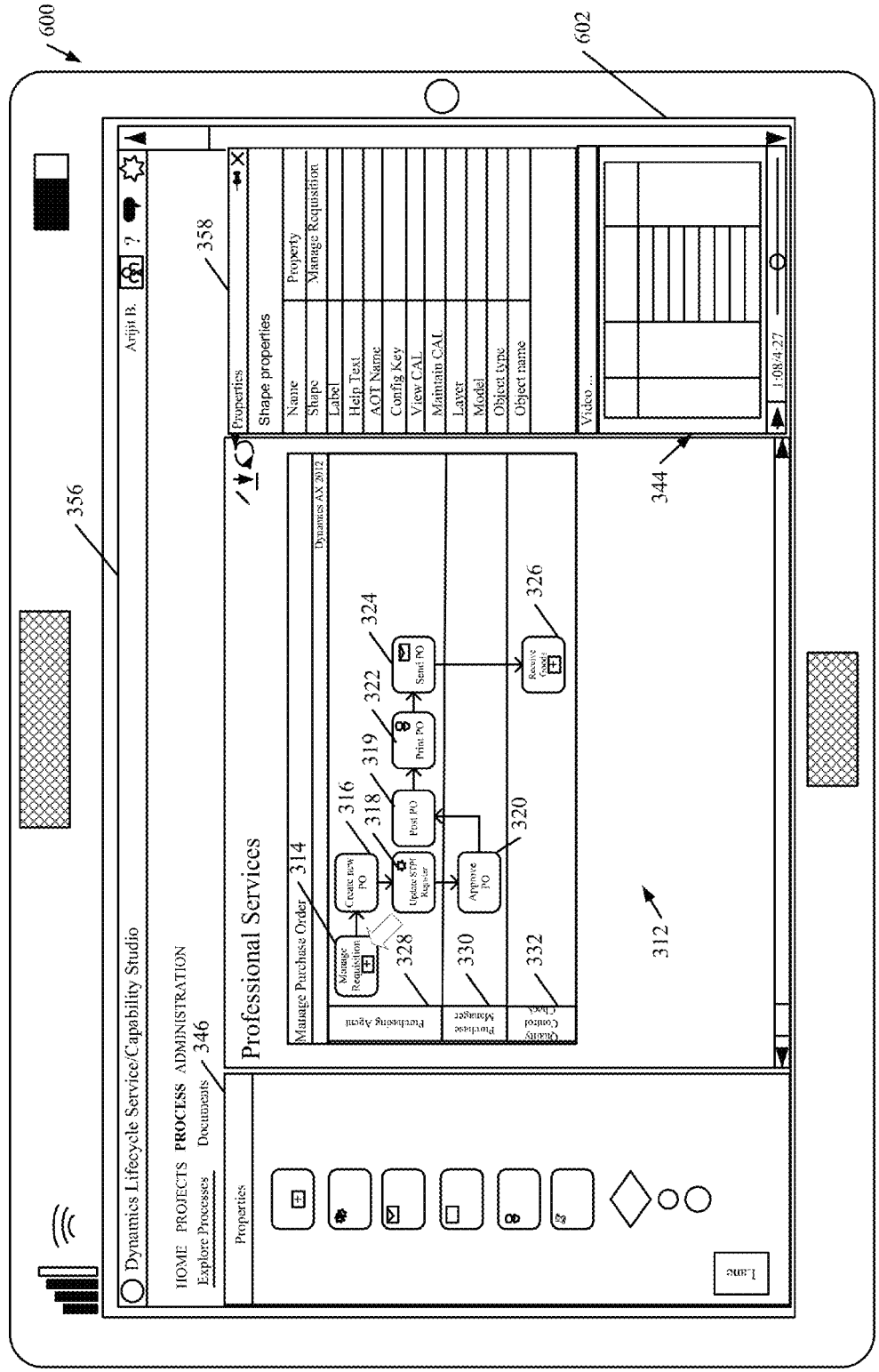

FIG. 8 shows one embodiment in which device 16 is a tablet computer 600. In FIG. 8, computer 600 is shown with user interface display 356 (of FIG. 3D) displayed on the display screen 602. Screen 602 can be a touch screen (so touch gestures from a user's finger 604 can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Figure 9:
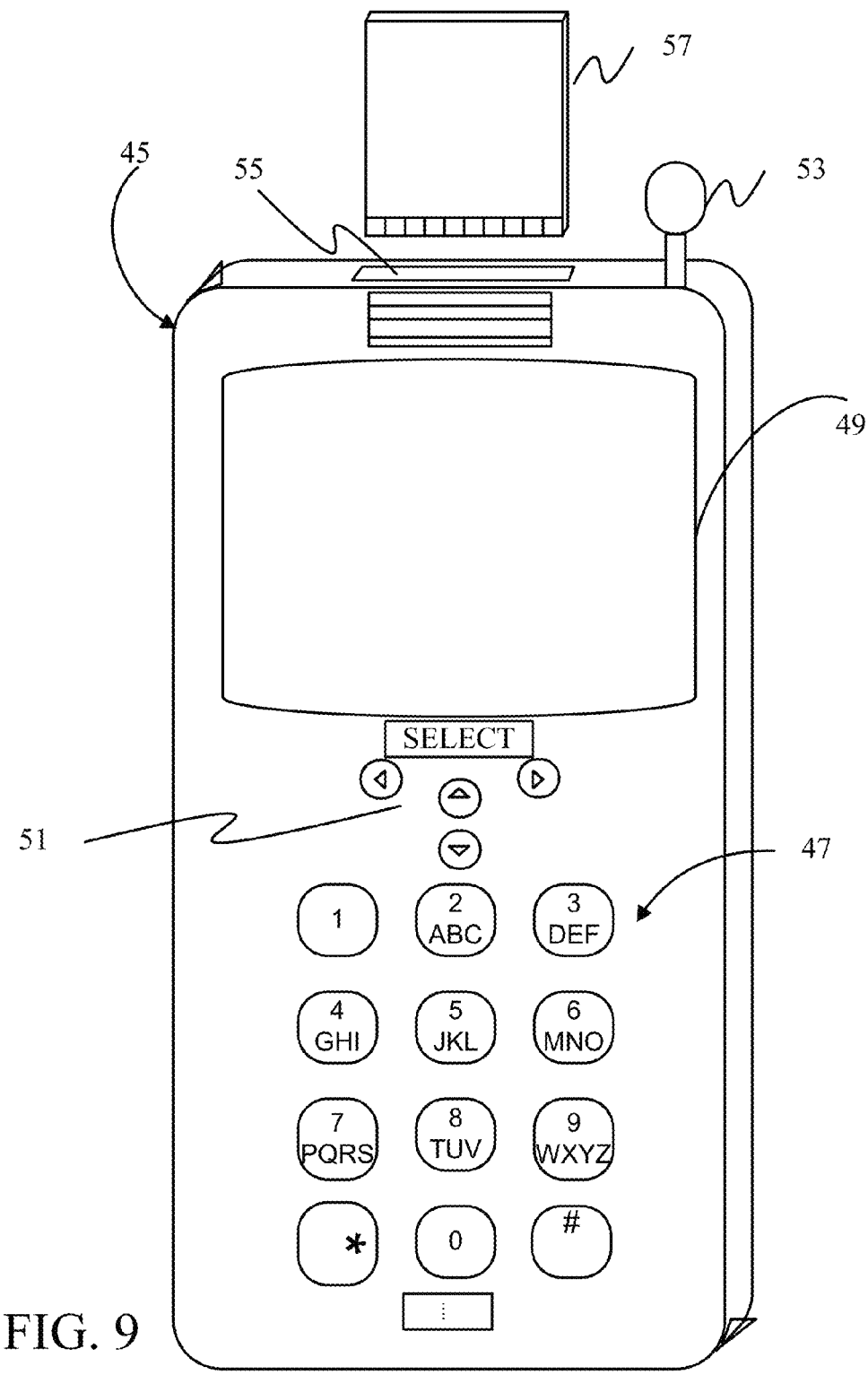
Figure 10:
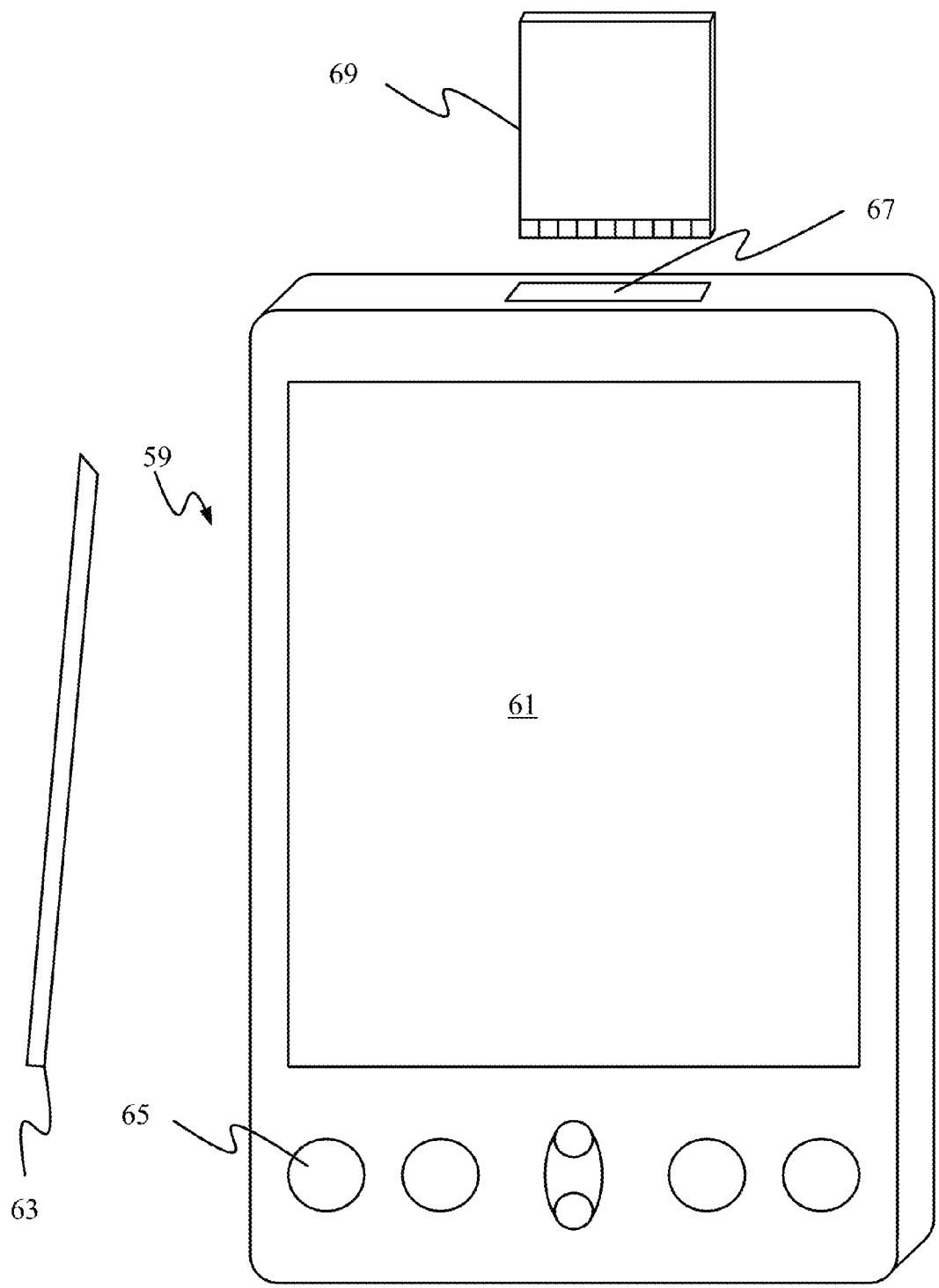

FIGS. 9 and 10 provide additional examples of devices 16 that can be used, although others can be used as well. In FIG. 9, a smart phone, or feature phone or mobile phone 45 is provided as the device 16. Phone 45 includes a set of keypads 47 for dialing phone numbers, a display 49 capable of displaying images including application images, icons, web pages, photographs, and video, and control buttons 51 for selecting items shown on the display. The phone includes an antenna 53 for receiving cellular phone signals such as General Packet Radio Service (GPRS) and 1Xrtt, and Short Message Service (SMS) signals. In some embodiments, phone 45 also includes a Secure Digital (SD) card slot 55 that accepts a SD card 57.

The mobile device of FIG. 10 is a personal digital assistant (PDA) 59 or a multimedia player or a tablet computing device, etc. (hereinafter referred to as PDA 59). PDA 59 includes an inductive screen 61 that senses the position of a stylus 63 (or other pointers, such as a user's finger) when the stylus is positioned over the screen. This allows the user to select, highlight, and move items on the screen as well as draw and write. PDA 59 also includes a number of user input keys or buttons (such as button 65) which allow the user to scroll through menu options or other display options which are displayed on display 61, and allow the user to change applications or select user input functions, without contacting display 61. Although not shown, FDA 59 can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections. In one embodiment, mobile device 59 also includes a SD card slot 67 that accepts a SD card 69.

In one example, the phone is a smart phone. The smart phone has a touch sensitive display that displays icons or tiles or other user input mechanisms. The user input mechanisms can be used by a user to run applications, make calls, perform data transfer operations, etc. In general, the smart phone is built on a mobile operating system and offers more advanced computing capability and connectivity than a feature phone.

Note that other forms of the devices 16 are possible.

Figure 11:
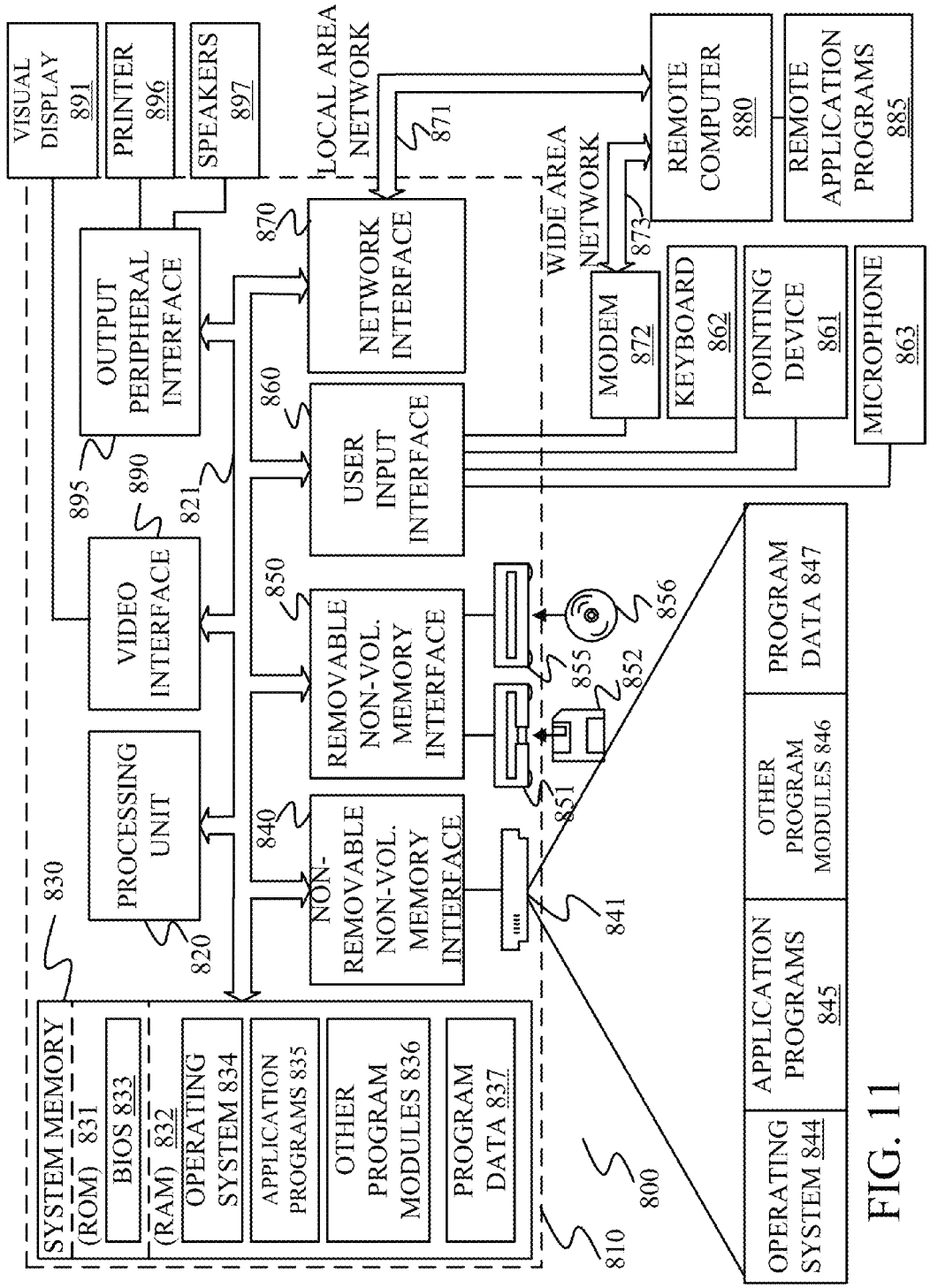
FIG. 11 is a block diagram of one illustrative computing environment.

FIG. 11 is one embodiment of a computing environment in which system 100 (for example) can be deployed. With reference to FIG. 11, an exemplary system for implementing some embodiments includes a general-purpose computing device in the form of a computer 810. Components of computer 810 may include, but are not limited to, a processing unit 820 (which can comprise processor 122), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 11.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 11 illustrates operating system 834, application programs 835, other program modules 836, and program data 837.

The computer 810 may also include other removable/non-removable volatile/nonvolatile computer storage media. By way of example only, FIG. 11 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Array (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 11, provide storage of computer readable instructions, data structures, program modules and other data for the computer 810. In FIG. 11, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 11 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 11 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method of generating a representation of a process, comprising:
   accessing metadata corresponding to a process in a data system;
   generating a visual diagram of the process based on the metadata;
   instructing a display device to display the visual diagram on a user interface display, the user interface display having a diagram modification user input mechanism for modifying the visual diagram and a security role user input mechanism for adding a security role to the process;
   receiving an indication of user actuation of the security role user input mechanism and, based on the received indication, defining a display area on the user interface display that corresponds to the security role added to the process;
   receiving an indication of a user modification input, through the diagram modification user input mechanism on the user interface display that displays the visual diagram, modifying the visual diagram by placing a user interface element, representing a task or activity in the process, within the display area that corresponds to the security role; and
   modifying the metadata to assign the security role to the task or activity in the process based on the user interface element being placed within the display area.

2. The computer-implemented method of claim 1, wherein the user interface display comprises a first display area corresponding to a first security role, and wherein defining the display area comprises defining a second display area that is visually distinguished from the first display portion area and corresponds to a second security role, and the method further comprising:

receiving an indication of a second user modification input that places a second user interface element, representing a second task or activity in the process, within one of the first or second display areas, wherein the second task or activity is assigned to one of the first security role or the second security role based on whether the second user interface element is placed in the first display area or the second display area.

3. The computer-implemented method of claim 2, wherein the first and second display areas comprise separate visual security lanes displayed in the user interface display.

4. The computer-implemented method of claim 2, and further comprising:
instructing the display device to display a properties display having a user input mechanism to receive user input that defines properties of the added security role.

5. The computer-implemented method of claim 1 and further comprising:
identifying work items to be performed on the process based on the modification to the visual diagram so the process operates as indicated by the modified visual diagram; and
storing the work items for viewing or export.

6. The computer-implemented method of claim 5 and further comprising:
automatically generating a fit gap list from the work items.

7. The computer-implemented method of claim 1 wherein receiving an indication of a user modification input comprises:
receiving an indication of a user drag and drop input modifying the visual diagram to add the task or activity to the visual diagram of the process.

8. The computer-implemented method of claim 1 wherein receiving an indication of a user modification input comprises:
receiving an indication of a user drag and drop input modifying the visual diagram to reposition the task or activity in the process.

9. The computer-implemented method of claim 1 wherein receiving an indication of a user modification input comprises:
receiving an indication of a user drag and drop input modifying the visual diagram to reposition a task or activity in the visual diagram; and
wherein assigning the security role comprises changing a security role assigned to the task or activity based on the repositioning of the task or activity in the visual diagram.

10. The computer-implemented method of claim 1 and further comprising:
receiving an indication of a user input to begin recording a portion of the process;
instructing the display device to display user interface displays from the data system to receive user inputs to perform the portion of the process; and
recording the user inputs, and corresponding metadata, performing the portion of the process.

11. The computer-implemented method of claim 10 wherein generating the visual diagram comprises: generating the visual diagram based on the recorded metadata.

12. A solution process mapping system, comprising:
a recorder component configured to obtain metadata corresponding to a process in a data system;
a user interface component configured to:
instruct a display device to display a user interface display with a diagram modification user input mechanism for modifying the visual diagram and a security role user input mechanism for adding a security role to the process, the user interface display displaying a visual diagram representing an ordered set of tasks for the process;
receive an indication of user interaction with the security role user input mechanism and, based on the received indication, defining a display area in the user interface display that corresponds to the security role added to the process;
receive an indication of user interaction with the diagram modification user input mechanism that modifies the visual diagram by placing a user interface element, representing a particular task for the process, within the display area in the user interface display;
a process modifier component configured to automatically modify the metadata corresponding to the process based on the modification to the visual diagram; and
a security role component configured to assign the security role to the particular task for the process based on the user interface element being placed within the display area in the user interface display.

13. The solution process mapping system of claim 12, wherein the user interface display comprises a first display area corresponding to a first security role, and wherein defining the display area comprises defining a second display area that is visually distinguished from the first display area and corresponds to a second security role, and wherein the user interface component is configured to:
receive an indication of a second user modification input that places a second user interface element, representing a second task or activity in the process, within one of the first or second display areas, wherein the second task or activity is assigned to one of the first security role or the second security role based on whether the second user interface element is placed in the first display area or the second display area.

14. The solution process mapping system of claim 12 wherein the recorder component is configured to generate the diagram as a flow diagram with shapes connected by connectors and wherein the process modifier component comprises:
a process navigator component configured to receive an indication of a user input actuating a given portion of the flow diagram and instruct the display device to display additional information about a portion of the process corresponding to the given portion of the flow diagram.

15. The solution process mapping system of claim 14 wherein the process navigator component is configured to receive an indication of a user input actuating a given connector on the flow diagram and to instruct the display device to display classes and methods used by the data system in performing process steps represented by the given connector.

* * * * *